United States Patent
Stokking et al.

(10) Patent No.: US 11,375,284 B2
(45) Date of Patent: Jun. 28, 2022

(54) STREAMING VIRTUAL REALITY VIDEO

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Hans Maarten Stokking, Wateringen (NL); Adrianus Holtzer, Delft (NL)

(73) Assignees: KONINKLIJKE KPN N.V., Rotterdam (NL); NEDERLANDSE ORGANISATIE VOOR TOEGEPAST-NATUURWETEN SCHAPPELIJK ONDERZOEK TNO, 'S-Gravenhage (NL)

(*) Notice: Subject to any disclaimer, the term of this patent is extended or adjusted under 35 U.S.C. 154(b) by 0 days.

(21) Appl. No.: 16/315,126

(22) PCT Filed: Jul. 6, 2017

(86) PCT No.: PCT/EP2017/066929
§ 371 (c)(1),
(2) Date: Jan. 3, 2019

(87) PCT Pub. No.: WO2018/011054
PCT Pub. Date: Jan. 18, 2018

(65) Prior Publication Data
US 2019/0313160 A1    Oct. 10, 2019

(30) Foreign Application Priority Data

Jul. 15, 2016 (EP) .................................. 16179654

(51) Int. Cl.
*H04N 21/6587* (2011.01)
*G06T 19/00* (2011.01)
(Continued)

(52) U.S. Cl.
CPC ....... *H04N 21/6587* (2013.01); *G06T 19/006* (2013.01); *H04L 12/1859* (2013.01);
(Continued)

(58) Field of Classification Search
CPC ......... H04N 21/6587; H04N 21/21805; H04N 21/2353; G06T 19/006; H04L 12/1859
See application file for complete search history.

(56) References Cited

U.S. PATENT DOCUMENTS 7,082,142 B1 * 7/2006 Begeja ............... H04N 7/17318
                                                          348/E7.071
9,210,200 B1 * 12/2015 Chapweske ......... H04L 65/4038
(Continued)

FOREIGN PATENT DOCUMENTS

CN     102413376 A     4/2012
CN     105144728 A    12/2015
(Continued)

OTHER PUBLICATIONS

"3rd Generation Partnership Project; Technical Specification Group Services and System Aspects; Study on Server And Network-assisted DASH (SAND) for 3GPP Multimedia Services (Release 14)," 3rd Generation Partnership Project, Sophia-Antipolis Cedex, France, 42 pages (2016).
(Continued)

*Primary Examiner* — William G Trost, IV
*Assistant Examiner* — Monishwar Mohan
(74) *Attorney, Agent, or Firm* — Hamilton, Brook, Smith & Reynolds, P.C.

(57) ABSTRACT

An improved streaming of a Virtual Reality [VR] video to a VR rendering device is provided. The VR video may be represented by a plurality of streams each associated with a different view of a scene. A view of the scene may be determined which is to be rendered by the VR rendering
(Continued)

device. A subset of streams may be identified which is needed to render the view of the scene. The streaming of the subset of streams to the VR rendering device may be effected by streaming the plurality of streams from a stream source to a forwarding node downstream of the stream sources and upstream of the VR rendering device, and selectively forwarding the subset of streams from the forwarding node to the VR rendering device in response to the view having to be rendered by the VR rendering device. As such, the switching latency between streams may be reduced. Namely, streams which are not needed for rendering a current view, but which may be needed for rendering a next view, may be continuously made available at network nodes nearby the VR rendering device.

10 Claims, 19 Drawing Sheets

(51) Int. Cl.
| | |
|---|---|
| H04L 12/18 | (2006.01) |
| H04N 21/218 | (2011.01) |
| H04N 21/235 | (2011.01) |
| H04N 21/44 | (2011.01) |
| H04N 21/845 | (2011.01) |
| H04N 21/462 | (2011.01) |
| H04N 21/81 | (2011.01) |
| H04N 21/262 | (2011.01) |

(52) U.S. Cl.
CPC ... *H04N 21/21805* (2013.01); *H04N 21/2353* (2013.01); *H04N 21/26258* (2013.01); *H04N 21/44004* (2013.01); *H04N 21/4622* (2013.01); *H04N 21/816* (2013.01); *H04N 21/8456* (2013.01)

(56) References Cited

U.S. PATENT DOCUMENTS

| | | | | |
|---|---|---|---|---|
| 9,538,160 | B1* | 1/2017 | Cole | H04N 13/243 |
| 9,578,356 | B1* | 2/2017 | Lin | H04N 21/222 |
| 10,320,691 | B1* | 6/2019 | Matthews | H04L 47/31 |
| 10,460,700 | B1* | 10/2019 | Mendhekar | H04L 41/0896 |
| 10,712,555 | B2 | 7/2020 | Schilt et al. | |
| 2002/0001310 | A1* | 1/2002 | Mai | H04L 12/1836 370/390 |
| 2004/0071083 | A1* | 4/2004 | Li | H04N 21/222 370/230 |
| 2007/0064689 | A1* | 3/2007 | Shin | H04L 61/103 370/389 |
| 2007/0201477 | A1* | 8/2007 | Ippach | H04L 65/4084 370/392 |
| 2010/0074594 | A1* | 3/2010 | Nakamura | H04N 13/341 386/241 |
| 2011/0082914 | A1 | 4/2011 | Robert | |
| 2012/0131146 | A1* | 5/2012 | Choi | H04L 65/4069 709/219 |
| 2012/0242781 | A1* | 9/2012 | Gautier | H04N 21/41415 348/36 |
| 2013/0060911 | A1* | 3/2013 | Nagaraj | H04N 21/4622 709/219 |
| 2013/0263200 | A1 | 10/2013 | Li | |
| 2014/0028798 | A1* | 1/2014 | Tsukagoshi | H04N 19/597 348/43 |
| 2014/0063187 | A1* | 3/2014 | Tsukagoshi | G09G 5/006 348/43 |
| 2014/0071236 | A1* | 3/2014 | Tsukagoshi | H04N 13/128 348/43 |
| 2014/0089500 | A1* | 3/2014 | Sankar | H04L 67/101 709/224 |
| 2014/0098185 | A1* | 4/2014 | Davari | H04N 5/23238 348/36 |
| 2014/0098186 | A1* | 4/2014 | Seidl | G06T 15/10 348/36 |
| 2014/0125762 | A1* | 5/2014 | Tsukagoshi | H04N 21/4307 348/43 |
| 2014/0152834 | A1* | 6/2014 | Kosseifi | H04N 21/21805 348/158 |
| 2014/0300532 | A1 | 10/2014 | Karkkainen et al. | |
| 2015/0249813 | A1 | 9/2015 | Cole | |
| 2015/0254882 | A1* | 9/2015 | Englert | G02B 27/017 345/633 |
| 2015/0302651 | A1* | 10/2015 | Shpigelman | G06T 19/006 345/633 |
| 2015/0346812 | A1* | 12/2015 | Cole | G06F 3/017 345/156 |
| 2015/0346832 | A1* | 12/2015 | Cole | H04L 65/4069 345/156 |
| 2016/0006673 | A1* | 1/2016 | Thomas | G06F 9/544 709/226 |
| 2016/0044095 | A1* | 2/2016 | Sankar | H04L 67/1012 709/223 |
| 2016/0094641 | A1* | 3/2016 | Rahman | H04L 67/1012 718/1 |
| 2016/0095043 | A1* | 3/2016 | Maria | H04L 45/64 370/254 |
| 2016/0101356 | A1* | 4/2016 | Kuo | H04N 21/4781 345/420 |
| 2016/0104510 | A1* | 4/2016 | Tamir | H04N 5/222 386/223 |
| 2016/0150212 | A1 | 5/2016 | Moura et al. | |
| 2016/0337206 | A1* | 11/2016 | Bugenhagen | G06F 3/0486 |
| 2016/0352857 | A1 | 12/2016 | Gouache et al. | |
| 2016/0373546 | A1 | 12/2016 | Lotfallah | |
| 2017/0078447 | A1* | 3/2017 | Hancock | H04N 21/4402 |
| 2017/0085501 | A1* | 3/2017 | Utgikar | H04L 45/54 |
| 2017/0134219 | A1 | 5/2017 | Taibi et al. | |
| 2017/0289219 | A1* | 10/2017 | Khalid | H04L 65/4084 |
| 2017/0318360 | A1* | 11/2017 | Tran | H04Q 9/00 |
| 2017/0339415 | A1 | 11/2017 | Wang | |
| 2017/0347026 | A1 | 11/2017 | Hannuksela | |
| 2017/0347163 | A1 | 11/2017 | Wang | |
| 2017/0366605 | A1* | 12/2017 | Chang | H04L 47/70 |
| 2018/0020204 | A1* | 1/2018 | Pang | H04N 19/42 |
| 2018/0035134 | A1* | 2/2018 | Pang | H04N 19/176 |
| 2018/0077210 | A1 | 3/2018 | Hannuksela et al. | |
| 2018/0139254 | A1 | 5/2018 | Pi | |
| 2018/0176613 | A1 | 6/2018 | Gouache | |
| 2018/0240276 | A1 | 8/2018 | He | |
| 2018/0350146 | A1 | 12/2018 | Gervasio | |
| 2019/0089643 | A1 | 3/2019 | Westphal | |
| 2019/0158815 | A1 | 5/2019 | He | |
| 2019/0230142 | A1 | 7/2019 | He | |
| 2019/0238861 | A1 | 8/2019 | D'Acunto | |
| 2019/0310472 | A1 | 10/2019 | Schilt | |
| 2019/0362151 | A1 | 11/2019 | Stokking | |
| 2020/0351532 | A1 | 11/2020 | Lee | |

FOREIGN PATENT DOCUMENTS

| | | |
|---|---|---|
| EP | 0909069 A3 | 1/2004 |
| EP | 1 826 978 A1 | 8/2007 |
| WO | WO 2012/125802 A1 | 9/2012 |
| WO | 2015/197815 A1 | 12/2015 |
| WO | 2016/115983 A1 | 7/2016 |
| WO | 2018/050606 A1 | 3/2018 |
| WO | 2018/083211 A1 | 5/2018 |

OTHER PUBLICATIONS

Barniv, Yair et al., "Using EMG to Anticipate Head Motion for Virtual-Environment Applications," IEEE Transactions on Biomedical Engineering, vol. 52, No. 6, pp. 1078-1093 (Jun. 2005).
Bartolini, Novella et al., "A Walk through Content Delivery Networks," International Workshop on Modeling, Analysis, and Simu-

(56) References Cited

OTHER PUBLICATIONS lation of Computer and Telecommunication Systems, 25 pages, (2003).
Carlier, Axel et al., "Towards Characterizing Users' Interaction with Zoomable Video," Social, Adaptive and Personalized Multimedia Interaction and Access, ACM, New York, NY, 4 pages (2010).
Fraunhofer, Fokus, "360 Video Experience on TV Device," www.fokus.fraunhofer.de/go/360, Apr. 7, 2016, 22 pages (2016).
Gheorghe, Lucian et al., "Steering Timing Prediction in a Driving Simulator Task," 2013 35th Annual International Conference of the IEEE Engineering in Medicine and Biology Society (EMBC), Jul. 3-7, 2013, Osaka, Japan, 4 pages.
Haufe, Stefan et al., "Electrophysiology-based detection of emergency braking intention in real-world driving," J. Neural Eng., 11: 1-8 (2014).
Kuzyakov, et al., "Next-Generation Video Encoding Techniques for 360 Video and VR," retrieved from URL: https://code.fb.com/virtual-reality/next-generation-video-encoding-techniques-for-360-video-and-vr/, 5 pages (Jan. 21, 2016).
Lew, Eileen et al., "Detection of self-paced reaching movement intention from EEG signals," Frontiers in Neuroengineering, vol. 5, Article 13: 1-17 (Jul. 2012).
"Ochi, Daisuke et al., ""Live Streaming for Omnidirectional Video,"" IEEE Virtual Reality Conference 2015, Arles, France, 2 pages (2015)."
Wang, Ye-Kui et al., "Signalling of most-interested regions of VR video," MPEG Meeting; May 30, 2016-Mar. 6, 2016; Geneva, 3 pages, (2016).
Advani et al., "Optimizing Video Delivery using OpenFlow," Capstan Final Paper, 9 pages, Apr. 25, 2015.
D'Aguanno, "Lan Protocol Attacks, Part 1, ARP Reloaded," Presented at Defcon 15, Las Vegas, Nevada, 35 pages, Aug. 2007.
International Search Report and Written Opinion dated Jul. 31, 2017 for International Application No. PCT/EP2017/066929, entitled "Streaming Virtual Reality Video."
Jennehag, et al., "Gradual Tune-in Pictures for Fast Channel Change," The 8th Annual IEEE Consumer Communications and Networking Conference-Special Session IPTV and Multimedia CDN, pp. 766-770, 2011.
Open Networking Foundation, "Software-Defined Networking: The New Norm for Networks," ONF White Paper, 12 pages, Apr. 13, 2012.
Ramos, et al., "Reducing channel change delay in IPTV by predictive pre-joining of TV channels," Signal Processing: Image Communication, vol. 26, pp. 400-412, 2011.
European Search Report dated Jan. 26, 2017, for EP Application No. EP 16 17 9654.
Egilmez, "Adaptive Video Streaming Over OpenFlow Networks with Quality of Service," *Thesis for Degree of Master Science in Electrical and Electronics Engineering*, Koç University (Jul. 2012).
Huszak, Arpad, "Advanced Free Viewpoint Video Streaming Techniques," Multimed Tools Appli, 76:373-396 (2017).

* cited by examiner

| direction | type | address |
|---|---|---|
| north | unicast RTP | 139.63.1.10 |
| east | unicast UDP | 139.63.1.11 |
| south | multicast RTP | 224.1.1.10 |
| west | multicast UDP | 224.1.1.11 |

STREAMING VIRTUAL REALITY VIDEO

This application is the U.S. National Stage of International Application No. PCT/EP2017/066929, filed Jul. 6, 2017, which designates the U.S., published in English, and claims priority under 35 U.S.C. § 119 or 365(c) to European Application No. 16179654.5, filed Jul. 15, 2016. The entire teachings of the above applications are incorporated herein by reference.

FIELD OF THE INVENTION

The invention relates to a method of streaming Virtual Reality [VR] video to a VR rendering device. The invention further relates to a computer program comprising instructions for causing a processor system to perform the method, to the VR rendering device, and to a forwarding node for use in the streaming of the VR video.

BACKGROUND ART

Virtual Reality (VR) involves the use of computer technology to simulate a user's physical presence in a virtual environment. Typically, VR rendering devices make use of Head Mounted Displays (HMD) to render the virtual environment to the user, although other types of VR displays and rendering techniques may be used as well, including but not limited to holography and Cave automatic virtual environments.

It is known to render VR video using such VR rendering devices, e.g., a video that is suitable for being played-out by a VR rendering device. The VR video may provide a panoramic view of a scene, with the term 'panoramic view' referring to, e.g., an at least 180 degree view. The VR video may even provide larger view, e.g., 360 degrees, thereby providing a more immersive experience to the user.

A VR video may be streamed to a VR rendering device as a single video stream. However, if the entire panoramic view is to be streamed in high quality and possibly in 3D, this may require a large amount of bandwidth, even when using modern video encoding techniques. For example, the bandwidth requirements may easily reach tens or hundreds of Mbps. As VR rendering devices frequently stream the video stream via a bandwidth constrained access network, e.g., a Digital Subscriber Line (DSL) or Wireless LAN (WLAN) connection, the streaming of a single video stream may place a large burden on the access network or such streaming may even not be feasible at all. For example, the play-out may be frequently interrupted due to re-buffering, instantly ending any immersion for the user. Moreover, the receiving, decoding and processing of such a large video stream may result in high computational load and/or high power consumption, which are both disadvantageous for many devices, esp. mobile devices.

It has been recognized that a large portion of the VR video may not be visible to the user at any given moment in time. A reason for this is that the Field Of View (FOV) of the display of the VR rendering device is typically significantly smaller than that of the VR video. For example, a HMD may provide a 100 degree FOV which is significantly smaller than, e.g., the 360 degrees provided by a VR video.

As such, it has been proposed to stream only parts of the VR video that are currently visible to a user of the VR rendering device. For example, the VR video may be spatially segmented into a plurality of non-overlapping video streams which each provide a different view of the scene. When the user changes viewing angle, e.g., by rotating his/her head, the VR rendering device may determine that another video stream is needed (henceforth also simply referred to as 'new' video stream) and switch to the new video stream by requesting the new video stream from a stream source.

Disadvantageously, the delay between the user physically changing viewing angle, and the new view actually being rendered by the VR rendering device, may be too large. This delay is henceforth also referred to as 'switching latency', and is sizable due to an aggregate of delays, of which the delay between requesting the new video stream and the new video stream actually arriving at the VR rendering device is typically the largest. Other, typically less sizable delays include delays due to the decoding of the video streams, delays in the measurement of head rotation, etc.

Various attempts have been made to address the latency problem. For example, it is known to segment the plurality of video streams into partially overlapping views, thereby providing so-termed 'guard bands' which contain video content just outside the current view. The size of the guard bands is typically dependent on the speed of head rotation and the latency of switching video streams. Disadvantageously, given a particular bandwidth availability, the use of guard bands reduces the video quality given a certain amount of available bandwidth, as less bandwidth is available for the video content actually visible to the user. It is also known to predict which video stream will be needed, e.g., by predicting the user's head rotation, and request the new video stream in advance. However, as in the case of guard bands, bandwidth is then also allocated for streaming non-visible video content, thereby reducing the bandwidth available for streaming currently visible video content.

It is also known to prioritize I-frames in the transmission of new video streams. Here, the term I-frame refers to an independently decodable frame in a Group of Pictures (GOP). Although this may indeed reduce the switching latency, the amount of reduction may be insufficient. In particular, the prioritization of I-frames does not address the typically sizable delay between requesting the new video stream and the packets of the new video stream actually arriving at the VR rendering device.

US20150346832A1 describes a playback device which generates a 3D representation of the environment which is displayed to a user of the customer premise device, e.g., via a head mounted display. The playback device is said to determine which portion of the environment corresponds to the users main field of view. The device then selects that portion to be received at a high rate, e.g., full resolution with the stream being designated, from a priority perspective, as a primary steam. Content from one or more other streams providing content corresponding to other portions of the environment may be received as well, but normally at a lower data rate.

A disadvantage of the playback device of US20150346832A1 is that it may insufficiently reduce switching latency. Another disadvantage is that the playback device may reduce the bandwidth available for streaming visible video content.

SUMMARY OF THE INVENTION

It would be advantageous to obtain a streaming of VR video which addresses at least one of the abovementioned problems of US20150346832A1.

In accordance with a first aspect of the invention, a method of streaming a Virtual Reality [VR] video to a VR rendering device is provided, wherein the VR video may be represented at least in part by a plurality of streams each associated with a different view of a scene, wherein the method may comprise:

determining a view of the scene which is to be rendered by the VR rendering device;

identifying one or more of the plurality of streams which are needed to render the view of the scene, thereby identifying a subset of streams; and effecting a streaming of the subset of streams via a network from one or more stream sources to the VR rendering device by:

i) streaming the plurality of streams from the one or more stream sources to one or more forwarding nodes downstream of the one or more stream sources and upstream of the VR rendering device; and ii) selectively forwarding the subset of streams from the one or more forwarding nodes to the VR rendering device in response to the view having to be rendered by the VR rendering device.

Another aspect of the invention provides a transitory or non-transitory computer-readable medium comprising a computer program, the computer program comprising instructions for causing a processor system to perform the method.

Another aspect of the invention provides a VR rendering device for rendering a VR video, wherein the VR video may be represented at least in part by a plurality of streams each associated with a different view of a scene, wherein the VR rendering device may comprise:

an input interface for receiving destination metadata indicative of a network destination of a streaming of each of the plurality of streams within a network, wherein the network destination may comprise one or more forwarding nodes in a network downstream of one or more stream sources streaming the plurality of streams and upstream of the VR rendering device; and a processor configured to:

i) determine a view of the scene which is to be rendered by the VR rendering device;

ii) identify, on the basis of the destination metadata, one or more of the plurality of streams which are needed to render the view of the scene, thereby identifying a subset of streams which is to be selectively forwarded by the one or more forwarding nodes to the VR rendering device.

In an embodiment, the VR rendering device may further comprise:

a controller configured to, on the basis of the destination metadata and in response to the view having to be rendered by the VR rendering device, signal the one or more forwarding nodes forwarding instructions for the one or more forwarding nodes to selectively forward the subset of streams to the VR rendering device.

The above measures may involve rendering a VR video on a VR rendering device. The VR video may be constituted by a plurality of streams, which may, but do not need to be, independently decodable video streams. The plurality of streams may be available from one or more stream sources in a network. A non-limiting example maybe that the stream source(s) are media server(s) accessible via the internet. The VR rendering device may render views of a scene represented by the VR video, with a current view being determined in accordance with a current viewing angle of the user. Here, the term 'view' may refer to the rendering of a spatial part of the VR video which is to be displayed to the user and which may thereby represent a visible part. A view generated in accordance with a viewing angle is also known as 'viewport'. During the use of the VR rendering device, different streams may thus be needed to render different views over time. The VR rendering device may identify which one(s) of the plurality of streams are needed to render a current or next view of the scene, thereby identifying a subset of streams. Here, the term 'subset' is to be understood as referring to 'one or more'. Moreover, the term 'current view' may refer to a view which is rendered at a given moment in time, wherein the term 'next view' may refer to a view which is to be rendered thereafter, e.g., in response to the user rotating his/her head, thereby replacing the current view. It will be appreciated that the functionality described in this paragraph may be known per se from the fields of VR and VR rendering.

In order to reduce the switching latency during use of the VR rendering device, the plurality of streams may be streamed from the one or more stream sources to one or more forwarding nodes downstream of the one or more stream sources and upstream of the VR rendering device. Here, the streaming to the one or more forwarding nodes is to be understood as including the streaming of all streams to a single forwarding node, the streaming of each stream to a different forwarding node, as well as all other combinations. If a particular subset of streams is then needed by the VR rendering device, e.g., for rendering a current or next view, the thereto corresponding subset of streams may be forwarded from the forwarding node(s) to the VR rendering device. As such, rather than continuously and/or indiscriminately streaming all of the plurality of streams to the VR rendering device, only a subset of the plurality of streams is forwarded at any moment in time during the streaming of the VR video. As such, a 'selectively' forwarding of streams, i.e., by selection, is obtained.

The above measures may have as effect that the switching latency is reduced. Namely, streams which are not needed for rendering a current view, but may be needed for rendering a next view, are already made available at forwarding nodes nearby the VR rendering device. Said streams may be made available continuously, or when it is estimated that they may be needed for rendering within a certain time (e.g. a view opposite the current view may not yet be needed). Such estimation may be performed by the VR rendering device, e.g. based on head rotation or head movement, and/or by the forwarding node, e.g. by simply selecting an adjacent view. By being located downstream of the stream source(s), the forwarding node(s) are located closer by the VR rendering device, e.g., as measured in terms of hops, ping time, number of nodes representing the path between source and destination, etc.

As such, the delay between the start of transmission of the subset of streams and their receipt by the VR rendering device may be reduced, e.g., in comparison to a switching of streams in which the streams are directly requested from the stream source(s), e.g., using a HTTP GET request. Shorter network paths may lead to shorter end-to-end delays, less chance of delays due to congestion of the network by other streams as well as reduced jitter, which may have as advantageous effect that there may be less need for buffering at the receiver. Compared to known network caching techniques, e.g., using a HTTP cache, the switching latency may be reduced by there being no or reduced request processing, content lookup, content retrieval from cache, packetisation, serialization, etc.

Moreover, by forwarding the subset of streams, a network layer mechanism may be used which inherently may have a lower delay than if the subset of streams were to be requested on an application layer, e.g., by a software application embodying a VR rendering engine. Such forwarding is made possible as the plurality of streams are streamed to forwarding nodes, e.g., network switches or network routers, which may be configured on a network layer to effect the selectively forwarding.

A further effect may be that the bandwidth allocation between the forwarding node(s) and the VR rendering device is reduced, as the streaming across this part of the network path may be limited to only those streams which are actually needed by the VR rendering device for rendering a particular view.

In an embodiment, the selectively forwarding the subset of streams may comprise stopping forwarding of a previous subset of streams which were previously selectively forwarded to the VR rendering device. By actively stopping the forwarding of a previous subset of streams, e.g., using any of the mechanisms described further onwards, the maximum bandwidth allocation between the forwarding node(s) and the VR rendering device may be reduced, or an increase due to a momentary simultaneous streaming of both subsets of streams may be kept to a minimum.

In an embodiment, the method may comprise starting the selectively forwarding of the subset of streams before stopping the selectively forwarding of the previous subset of streams. This may ensure that at least one view of the VR video remains available. Namely, if the selectively forwarding of the previous subset of streams were to be stopped before the selectively forwarding of the (current) subset of streams were to be started, or before said streams were received and/or decoded by the VR rendering device, it may momentarily occur that no view can be rendered.

In an embodiment, the selectively forwarding may be performed by the one or more forwarding nodes on the basis of one or more forwarding rules, and the method may comprise signaling the one or more forwarding nodes forwarding instructions to change the one or more forwarding rules so as to effect the selectively forwarding of the subset of streams. The forwarding of streams by the forwarding node(s) may be configured by one or more forwarding rules. For example, such forwarding rule(s) may be comprised as configuration data in an internal memory of the forwarding node(s). The selectively streaming of the subset of streams may thus be effected by appropriately changing the forwarding rule(s). Such changes may be initiated by signaling forwarding instructions to the forwarding node(s). An advantage of this embodiment may be that the selectively forwarding may be at least in part remotely controlled, e.g., by an entity located outside of the forwarding node(s).

In an embodiment related to the previous embodiment, a transitory or non-transitory computer-readable medium may be provided comprising forwarding instructions for use by one or more forwarding nodes in a network, wherein the one or more forwarding nodes may be a network destination of a streaming of a plurality of streams, and wherein the forwarding instructions may be configured to instruct the one or more forwarding nodes to selectively forward one or more of the plurality of streams to a Virtual Reality [VR] rendering device.

In an embodiment, the signaling of the forwarding instructions may be performed by the VR rendering device. As such, the selectively forwarding may be at least in part remotely controlled by the VR rendering device. The signaling of forwarding instructions by the VR rendering device may be regarded as requesting a subset of streams by the VR rendering device. An advantage of this embodiment may be that the VR rendering device may already be aware of which subset of streams is to be forwarded, and may thus directly effect their forwarding by signaling appropriate forwarding instructions to the forwarding node(s). In an embodiment, the plurality of streams may be streamed to the one or more forwarding nodes using multicasting, and the selectively forwarding of the subset of streams may comprise the VR rendering device joining a multicast group providing the subset of streams. It has been found that dense-mode multicasting is suitable for reducing switching latency in VR applications, unlike the sparse type of multicasting, as employed by, e.g., US20150346832A1. Here and in the following, the adjective 'dense-mode' is to be understood as referring to the general concept in multicasting of forwarding streams to network nodes in advance of terminals requesting those streams, which thereby includes, but is not limited to, dense-mode multicast according to RFC3973. Namely, all of the plurality of streams may be streamed to the forwarding node(s) irrespective of whether a VR rendering device has joined a respective multicasting group. This may also comprise streaming to the forwarding node when not a single VR rendering device has (yet) joined the respective multicasting group. Thus, each of the plurality of streams may be available and readily forwarded once a VR rendering device joins a multicasting group.

In an embodiment, the one or more forwarding nodes may be Software Defined Network [SDN] nodes, and the selectively forwarding of the subset of streams may comprise controlling the one or more forwarding nodes using an SDN controller to forward packets of the subset of streams to the VR rendering device and/or to drop packets of other streams. The forwarding node(s) may thus at least in part be software definable by being part of a SDN, e.g., represented by the network or part thereof, and thereby reconfigurable by a SDN controller to effect the selective forwarding.

In an embodiment, the multicasting may be effected by each of the plurality of streams being streamed to the one or more forwarding nodes in unicast, and the method may further comprise controlling one or more forwarding nodes to convert each of the unicast streams into a multicast stream. As such, SDN and multicasting may be combined to effect the selective forwarding of the subset of streams to the VR rendering device.

In an embodiment, the selectively forwarding of the subset of streams may comprise modifying an Address Resolution Protocol [ARP] table of the one or more forwarding nodes to specify a hardware address of the VR rendering device as recipient of the subset of streams. As such, so-termed 'ARP spoofing' may be employed, which may involve initializing the ARP table of forwarding node(s) with combinations of non-existing hardware addresses and IP addresses. If a particular subset of streams is to be selectively forwarded, the IP address to which the subset of streams are streamed may be associated with the actual hardware address of the VR rendering device, thereby designating the VR rendering device as recipient for the subset of streams. 'Hardware address' may refer to 'physical address' and vice versa.

In an embodiment, the method may further comprise signaling destination metadata to the VR rendering device which is indicative of a network destination of the streaming of each of the plurality of streams. For example, such destination metadata may be made available as part of a Media Presentation Description (MPD).

In an embodiment related to the previous embodiment, a transitory or non-transitory computer-readable medium may be provided comprising destination metadata for use by a Virtual Reality [VR] rendering device configured to render a VR video, wherein the VR video may be represented at least in part by a plurality of streams, and wherein the destination metadata may be indicative of a network destination of a streaming of each of the plurality of streams within a network. In an embodiment, the VR rendering device may comprise the computer-readable medium comprising the destination metadata, e.g., in the form of an internal memory.

In an embodiment, the VR rendering device may be connected to the network via a bandwidth constrained access network, and the one or more forwarding nodes may be edge nodes of the network at the edge to the bandwidth constrained access network. The edge nodes may be nodes of the network which are located in the last hop in the path in the network from the stream source(s) to the VR rendering device. As such, they may be located at the edge between the network and the bandwidth constrained access network. A specific yet non-limiting example is that the forwarding nodes may be comprised in Digital Subscriber Line Access Multiplexers (DSLAMs) before the Digital Subscriber Line (DSL) to the customer premises.

Another aspect of the invention may provide a forwarding node configured to receive a plurality of streams of a VR video. The forwarding node may comprise:

a signaling interface configured to receive forwarding instructions to change one or more forwarding rules of the forwarding node so as to selectively forward one or more of the plurality of streams to a VR rendering device; and a controller configured to effect the forwarding instructions by changing the one or more forwarding rules of the forwarding node.

Such changing of forwarding rules may comprise, e.g., creating a forwarding rule, modifying a forwarding rule, deleting a forwarding rule.

In an embodiment, the forwarding node may be a network switch or network router. The forwarding node may be a Software Defined Network [SDN] node.

It will be appreciated by those skilled in the art that two or more of the abovementioned embodiments, implementations, and/or aspects of the invention may be combined in any way deemed useful.

Modifications and variations of the VR rendering device, the forwarding node(s), the forwarding instructions, the destination metadata and/or the computer program, which correspond to the described modifications and variations of the method, and vice versa, can be carried out by a person skilled in the art on the basis of the present description.

The skilled person will appreciate that a stream comprising sub-streams may be processed to obtain a plurality of streams based on the sub-streams. Thus in the present invention, the plurality of streams may be a plurality of sub-streams that are contained in a single first stream from a source to the at least one forwarding node, and/or the subset of the plurality of streams may be a subset of sub-streams contained in a single second stream from the at least one forwarding node to the VR rendering device.

BRIEF DESCRIPTION OF THE DRAWINGS

These and other aspects of the invention are apparent from and will be elucidated with reference to the embodiments described hereinafter. In the drawings.

Figure 2:
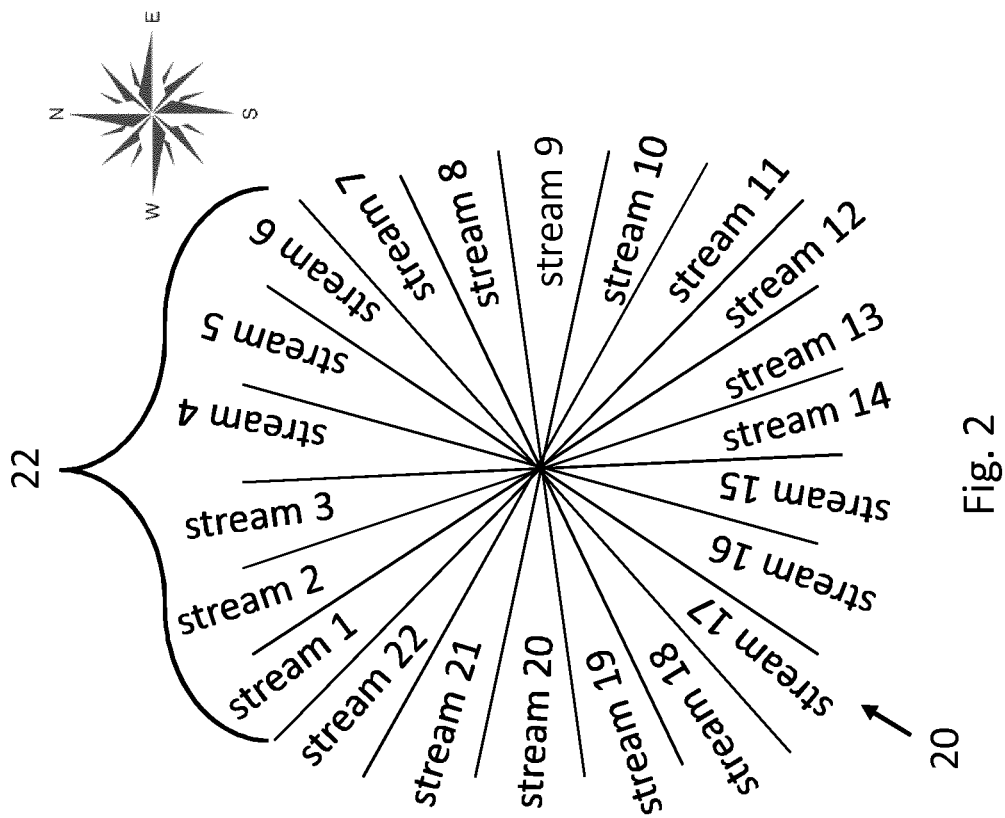
FIG. 2 shows another plurality of streams representing another VR video.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

ARP Address Resolution Protocol
CMTS Cable Modem Termination System
DASH Dynamic Adaptive Streaming over HTTP
DSLAM Digital Subscriber Line Access Multiplexer
FLUTE File Delivery over Unidirectional Transport GGSN Gateway GPRS Support Node
GPRS General Packet Radio Service
IGMP Internet Group Management Protocol
MAC Media Access Control
MPD Media Presentation Description
PDN Packet Data Network
PGW PDN Gateway
RNC Radio Network Controller
RTP Real-time Transport Protocol
SAND Server and Network Assisted DASH
SDN Software Defined Network
SGSN Serving GPRS Support Node
SGW Serving Gateway
VR Virtual Reality
10, 20 plurality of streams
22 subset of streams
30 access network
40 core network
42 internet
100 VR rendering device
102 "request stream" data communication
110 forwarding node
112 "forward stream" data communication
120 server
122 "send stream 1" data communication
124 "send stream 2" data communication
200 terminal
202 modem
204 wireless access point
206 CMTS
208 DSLAM
210 metro access node
212 metro core node
220 terminal
222 nodeB
224 RNC
226 SGSN
228 GGSN
230 terminal
234 SGW
236 PGW
300 receiver
310 edge node
320 network
330 server
312 SDN edge node
340 SDN controller
400-408 destination metadata
410-414 signaling from receiver/edge node
420 message format for ARP protocol
422, 424 ARP request
500 receiver
502 receiver with MAC address A
504 receiver with SDN controller
510 switch
512 switch with MAC access B
514 SDN switch
520 SDN controller
530 server
600 VR rendering device
610 input/output interface
620 controller
630 processor
700 forwarding node
710 signaling interface
720 controller
800 method of streaming VR video to VR rendering device
810 determining view of scene to be rendered
820 identifying needed stream(s)
830 effecting streaming of needed stream(s)
840 streaming all streams to forwarding node(s)
850 selectively forwarding needed stream(s)
900 computer readable medium
910 data stored on computer readable medium
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following describes several embodiments of streaming a VR video to a VR rendering device, which may comprise streaming a plurality of streams from one or more stream sources to one or more forwarding nodes downstream of the one or more stream sources and upstream of the VR rendering device, and selectively forwarding a subset of said streams from the one or more forwarding nodes to the VR rendering device in response to a view having to be rendered by the VR rendering device.

In the following, the VR rendering device may simply be referred to as 'terminal', 'receiver' or 'client', a stream source may simply be referred to as 'server' and a forwarding node may simply be referred to as 'edge node' or 'switch'.

Figure 1:
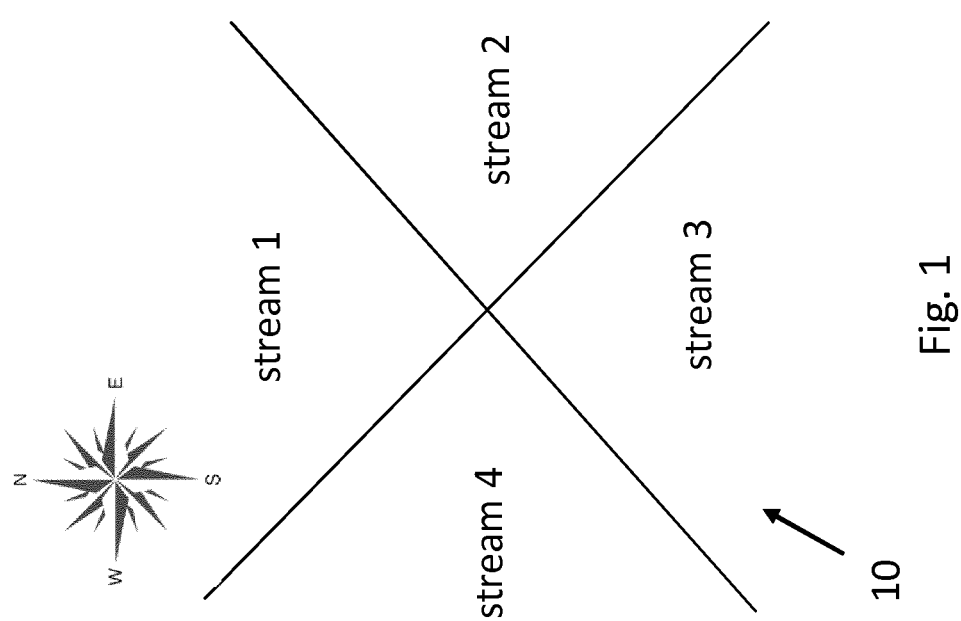
FIG. 1 shows a plurality of streams representing a VR video.

As illustrated in FIGS. 1 and 2, the VR video may be streamed using a plurality of different streams 10, 20 to provide a panoramic view from a certain viewpoint, e.g., that of the user in the VR environment. In the examples of FIGS. 1 and 2, the panoramic view is shown to be a complete 360 degree view, which is shown in FIG. 1 to be divided into 4 sections corresponding to the cardinal directions N, E, S, W, with each section being represented by a certain stream (e.g., north=stream 1, east=stream 2, etc.). As such, in order for the VR rendering device to render a view in a north-facing direction, stream 1 may be needed. If the user turns east, the VR rendering device may have to switch from stream 1 to stream 2 to render a view in an east-facing direction.

In practice, it has been found that users do not instantaneously turn their head, e.g., by 90 degrees. As such, it may be desirable for streams to spatially overlap, or a view to be rendered from multiple streams or segments which each represent a smaller portion of the entire panoramic view. For example, as shown in FIG. 2, the VR rendering device may render a view in the north-facing direction based on streams 1, 2, 3, 4, 5 and 6. When the user turns his/her head east, stream 7 may be added and stream 1 removed, then stream 8 may be added and stream 2 may be removed, etc. As such, in response to a head rotation or other type of change in viewpoint, a different subset of streams 20 may be needed. Here, the term 'subset' refers to 'one or more' streams. It will be appreciated that subsets may overlap, e.g., as in the example of FIG. 2, where in response to a user's head rotation the VR rendering device may switch from the subset 20 of streams {1, 2, 3, 4, 5, 6} to a different subset {2, 3, 4, 5, 6, 7}.

It will be appreciated that, although not shown in FIGS. 1 and 2, the VR video may include streams which show views above and below the user. Moreover, although FIGS. 1 and 2 each show a 360 degree panoramic video, the VR video may also represent a more limited panoramic view, e.g., 180 degrees. Furthermore, the streams may, but do not need to, partially or entirely overlap. An example of the former is the use of 'guard bands'. An example of the latter is that each stream may comprise the entire 360 degree view in low resolution, while each comprising a different and limited part of the 360 degree view, e.g., a 20 degree view, in higher resolution. Such different parts may be of various shapes, e.g., rectangles, triangles, cubes, etc.

Figure 3:
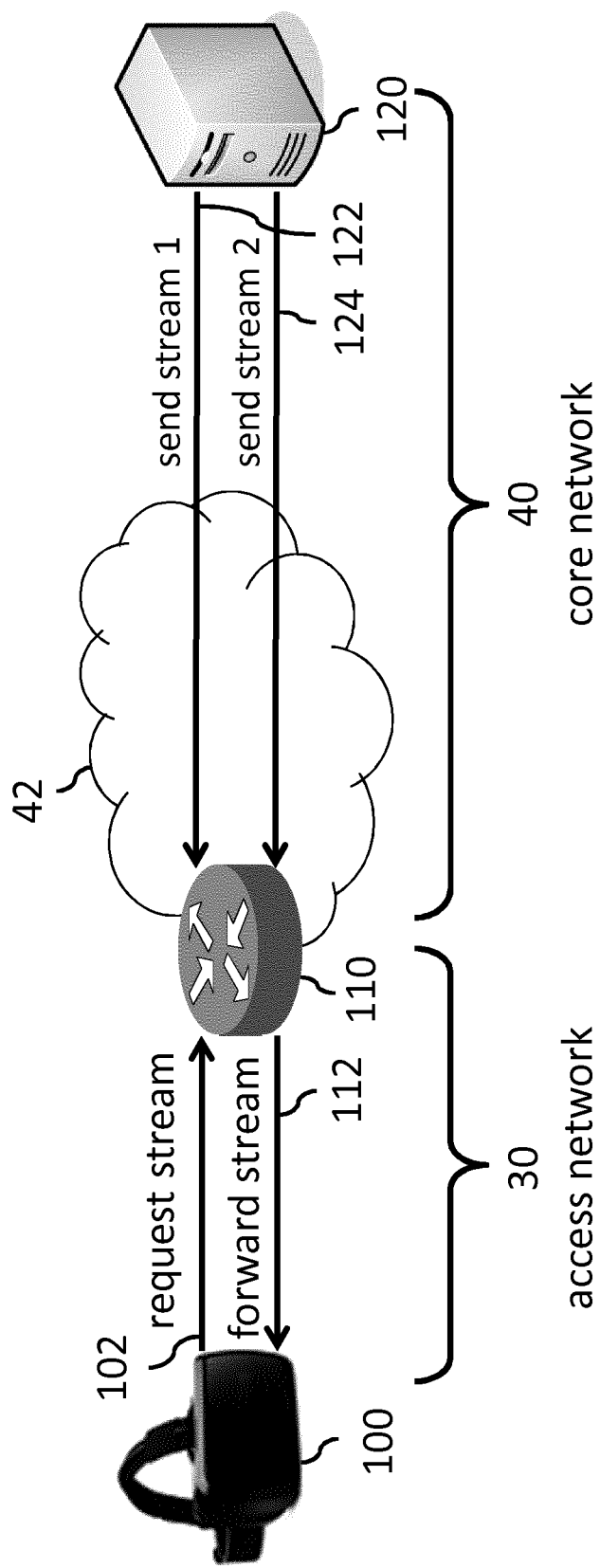
FIG. 3 illustrates the streaming of a VR video from a server to a VR rendering device in accordance with one aspect of the invention.

FIG. 3 illustrates the streaming of VR video from a server 120 to a VR rendering device 100 in accordance with one aspect of the invention. In particular, FIG. 3 shows two streams being streamed from the server 120 to a forwarding node 110, e.g., in a continuous and non-selective manner, as illustrated by data communication "send stream 1" 122 and "send stream 2" 124. In response to a view having to be rendered by the VR rendering device 100 which necessitates one of the streams, the particular stream may then be selectively forwarded by the forwarding node 110 to the VR rendering device 100, as illustrated by data communication "forward stream" 112, e.g., in response to a request "request stream" 102 from the VR rendering device.

As also shown in FIG. 3, the forwarding node 110 may be positioned at an edge between a core network 40 and an access network 30 via which the VR rendering device 100 may be connected to the core network 40. Accordingly, a forwarding node may henceforth also simply be referred to as 'edge node'. The core network 40 may comprise, or be constituted by the internet 42, although this is not a limitation.

Figure 4:
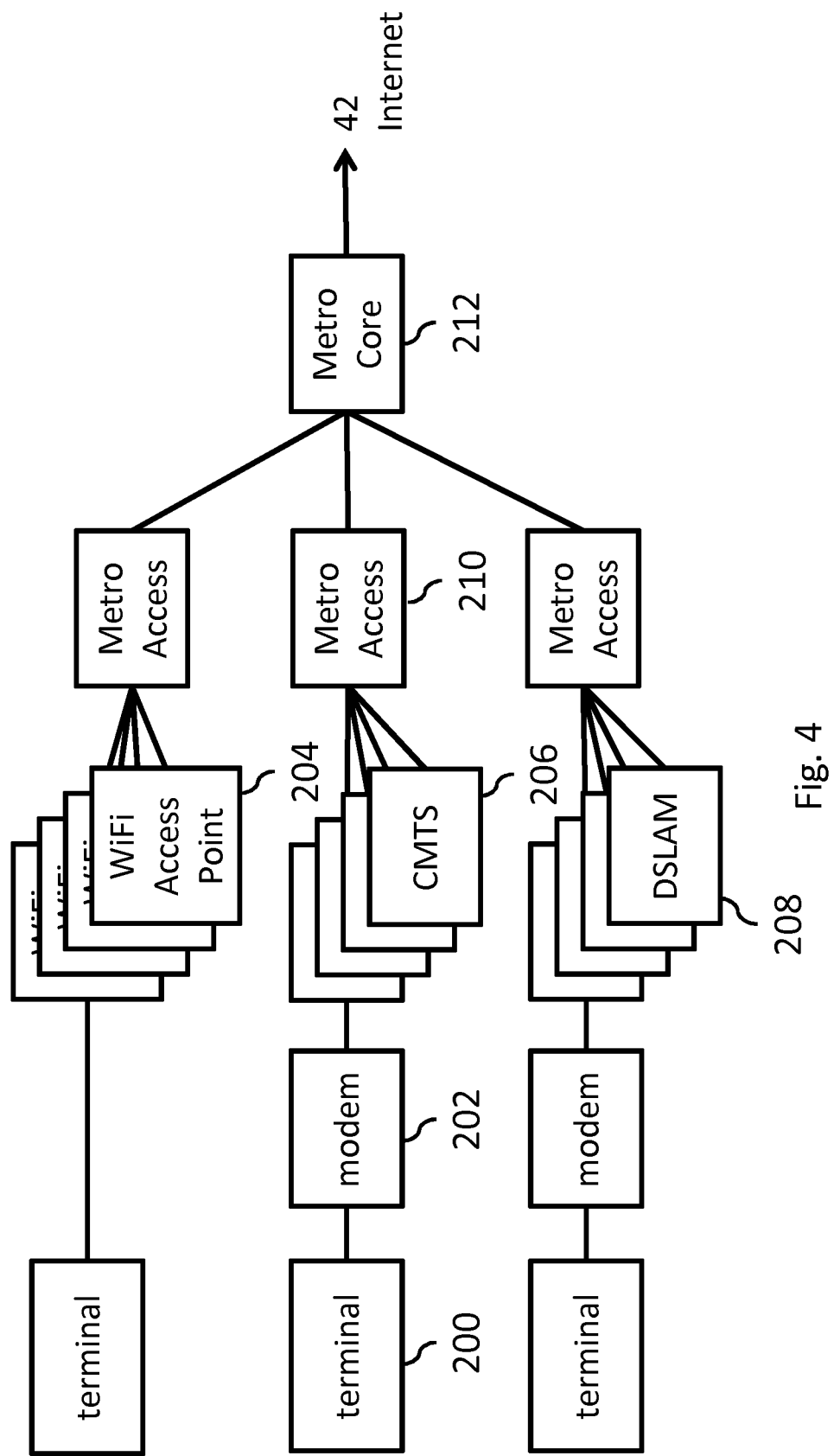
FIG. 4 shows examples of bandwidth constrained access networks via which the VR rendering device may be connected to a core network.

The access network 30 may be bandwidth constrained compared to the core network 40. FIG. 4 shows various examples of such bandwidth constrained access networks via which the VR rendering device may be connected to the core network. In particular, FIG. 4 shows a terminal 200, which may be the VR rendering device itself or a local gateway or similar device, which is connected to the internet 42 via a modem 202, a CMTS 206, a metro access node 210 and a metro core node 212. Alternatively, the terminal may be connected via a DSL modem to a DSLAM 208 which may itself be connected to a metro access node. Alternatively, the terminal may be connected via a wireless access point 204, such as a Wi-Fi access point, to a metro access node.

Figure 5:
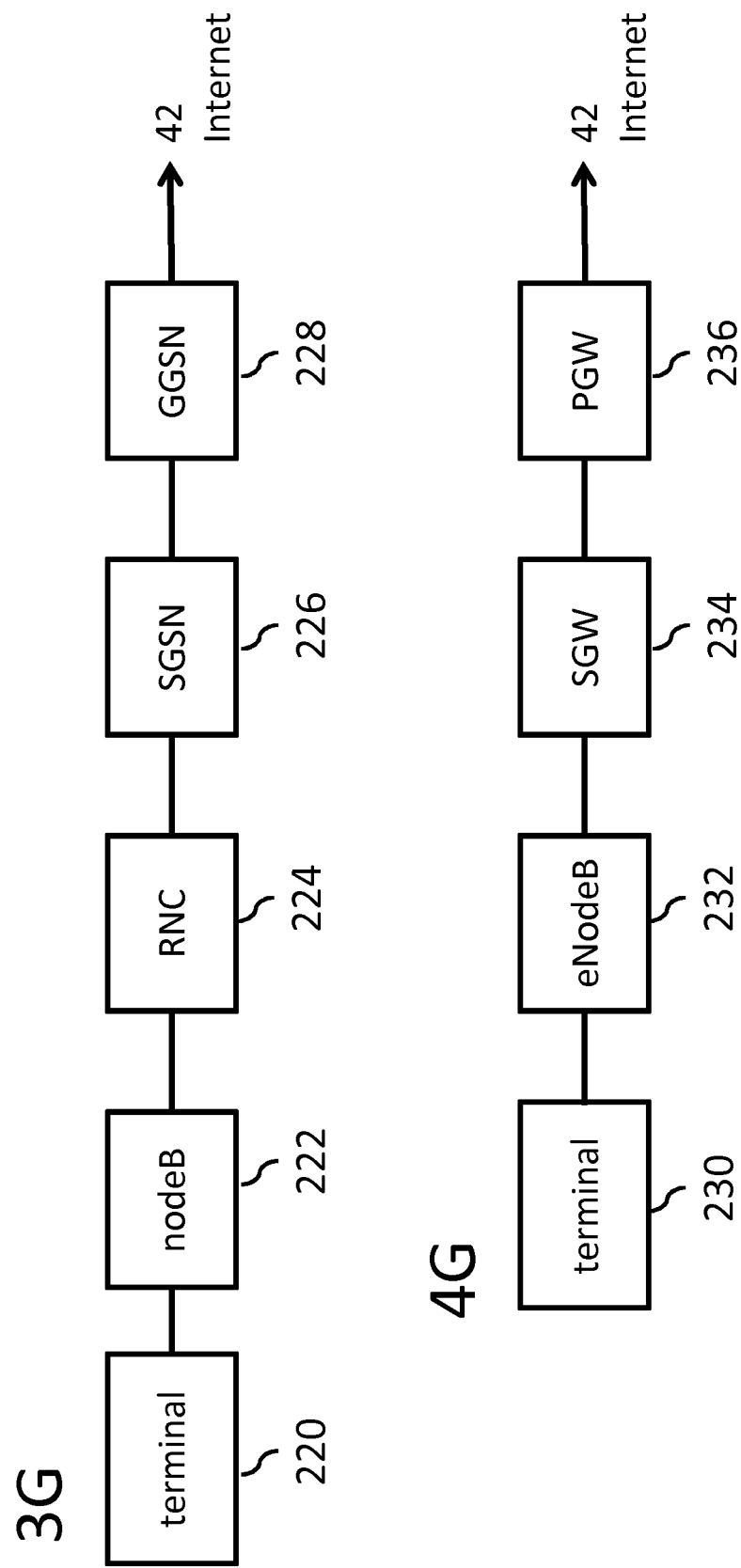
FIG. 5 shows other examples of bandwidth constrained access networks in the form of a 3G mobile access network and a 4G mobile access network.

FIG. 5 shows other examples of bandwidth constrained access networks in the form of a 3G mobile access network and a 4G mobile access network. It will be appreciated that FIGS. 4 and 5 merely represent non-limiting examples of bandwidth constrained access networks, and that the selective forwarding may be performed across various other types of bandwidth constrained access networks.

In order to enable the selective forwarding of a subset of streams from the forwarding node(s) to the VR rendering device, all, or a larger subset of streams, may be streamed from the stream source(s) to the forwarding node(s), e.g., in a continuous manner. This concept is henceforth also simply referred to as 'making streams available at the network edge'. Here, the term 'larger subset' may refer to a subset which comprises the subset of streams which is currently forwarded to the VR rendering device, as well as adjacent streams, e.g., comprising spatially adjacent video information. As such, if a different subset of streams is needed, the different subset may still be comprised in the larger subset of streams which are available at the network edge, e.g., due to changes in the user's viewpoint being typically incremental.

There exist various ways of making streams available at the network edge, including but not limited to sending them to an IP address that is routed there, e.g., using RTP streaming to a unicast address in a subnet on the network edge or to a multicast address which leads there, e.g., using dense-mode multicast. In case of HTTP Adaptive Streaming, the server may perform a server-push of segments or parts (e.g., byte ranges) of segments to an IP address on the network edge, e.g., using the SAND feature of MPEG-DASH, or may use, e.g., FLUTE and perform multicast DASH. Several other examples will be given with further reference to FIGS. 8-11.

In some embodiments, the VR rendering device may need to be aware of which stream is available where, how the various stream may be accessed, and how the various streams fit in the entire panoramic video, e.g., their spatial relationship. This information may be made available in the form of 'destination metadata', which may at least be indicative of a streaming destination of the streams and thus where on the network edge the streams are made available. There exist various ways of making the destination metadata available to the VR rendering device. For example, the destination metadata may be signaled to the VR rendering device, the VR rendering device may subscribe to a stream announcement protocol, the destination metadata may be included in a manifest or specifically MPD when using MPEG DASH, etc.

Figures 6, 7:
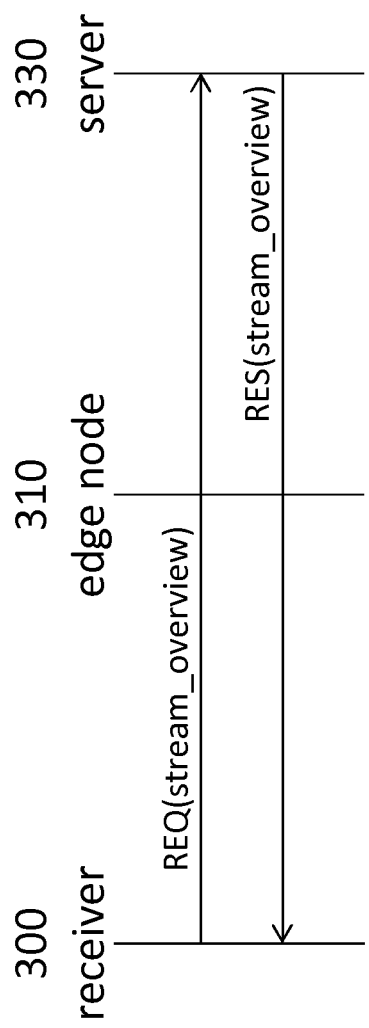
FIG. 6 illustrates a signaling between the server and the receiver.
FIG. 7 shows an example of destination metadata which may be signaled by the server to the receiver.

FIG. 6 illustrates the aforementioned signaling of the destination metadata from a server 330 to the VR rendering device, or in general, to a receiver 300. Namely, in response to a request from the receiver 300 for the destination metadata, e.g., using a message 'REQ(stream_overview)', the server 330 may respond to the request by sending the destination metadata, e.g., using a message 'RES(stream_overview)'.

An example of destination metadata 400 is shown in FIG. 7 in a simplified, tabular form. In this example, the destination metadata 400 is indicative of which stream is associated with which viewing direction, e.g., by way of the 'direction' column listing the cardinal direction, how the stream may be accessed, e.g., by way of the 'type' column, and where the stream may be accessed, e.g., by way of the 'address' column listing an destination address of the respective stream. It is noted that such destination metadata is different from the information normally used for retrieving a stream as such information normally lists the server URL at which to retrieve the stream. In contrast, in the destination metadata, the network address may be listed to which the stream is currently being sent, e.g., an address of an edge node.

With further reference to the various ways of making the streams available at the network edge, various embodiments are shown in FIGS. 8-11. In these embodiments, the streams may be simply referred to by way of the angle which they represent, with the angle referring to, e.g., a cardinal direction or index number, e.g., 'angle 1'. Furthermore, different examples of selective forwarding of the streams, also referred to as 'switching techniques', will be explained with reference to FIGS. 12-18.

Figure 8:
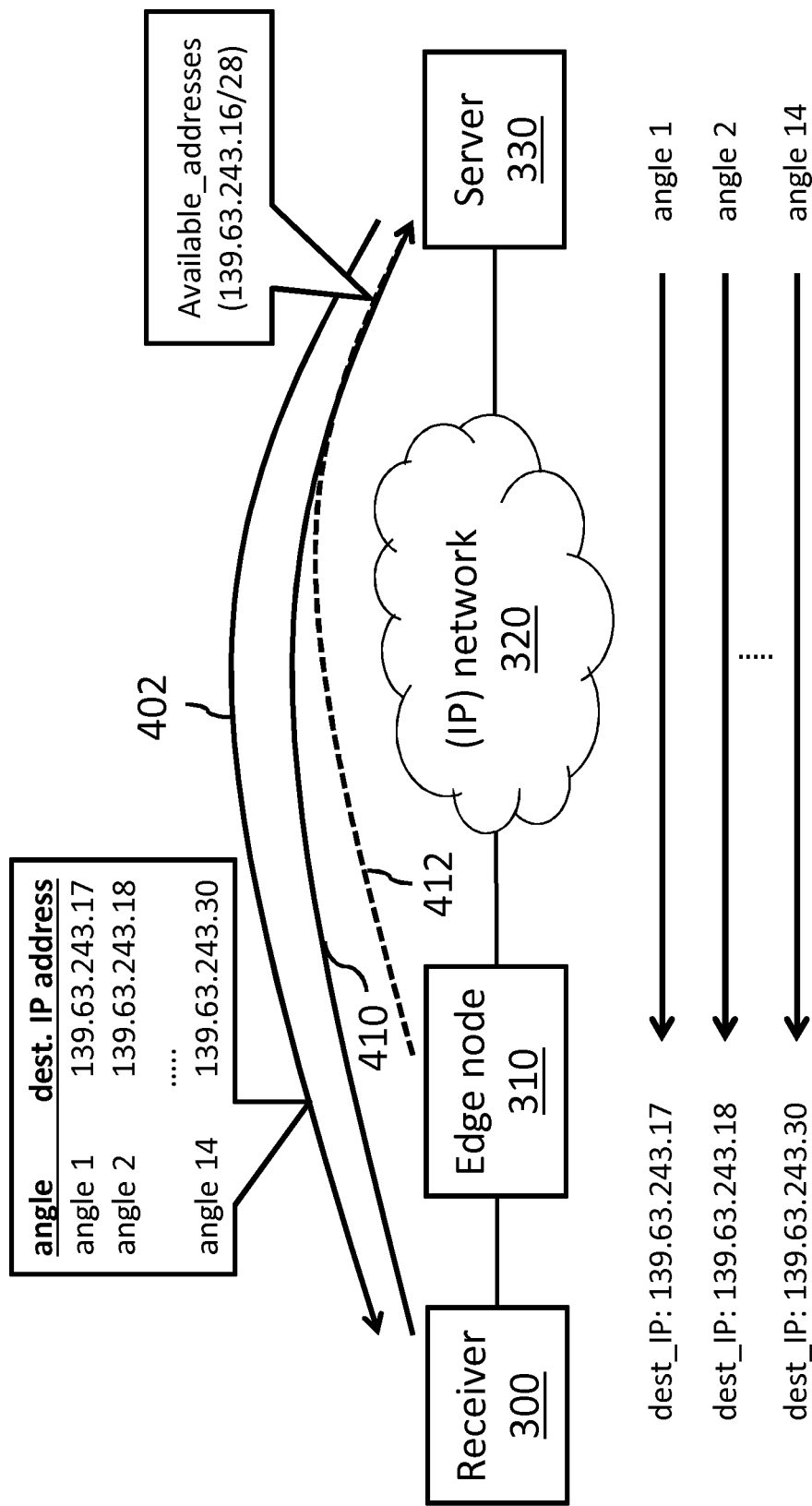
FIG. 8 illustrates the streaming of a plurality of streams to an edge node by way of using different destination addresses for each of the streams.

FIG. 8 illustrates the streaming of a plurality of streams to an edge node by way of using different destination addresses for each of the streams. Namely, in this example, the receiver 300 may have information on a range of available network addresses, in this case the subnet 139.63.243.16/28 (range 139.63.243.16-139.63.243.31, with 0.16 being the gateway address and 0.31 being the broadcast address, leaving 14 available host addresses). In order to initialize the streaming, the receiver 300 may indicate these addresses to the server 330, e.g., using a signaling 410 of the available addresses. The fourteen addresses may then be matched to fourteen different angles which may be requested by the receiver 300, which may be signaled to the receiver 300 in the form of destination metadata 402. The server 330 may then start the streaming of those streams via the network 320 to the respective addresses, e.g., to a respective edge node 310 at the edge of the network 320.

FIG. 8 further illustrates another embodiment, namely that the signaling of the available network addresses may be performed by the edge node 310 rather than by the receiver 300. This may require the edge node 310 to be aware of the request for streams. However, unlike the receiver 300, which may only have access to a single network address, the edge node 310 may be configured to allocate additional addresses 'on the fly'. As such, the edge node 310 may allocate network addresses for a specific streaming session. The IP addresses may be public addresses or, if the edge node 310 is an SDN node, the edge node 310 may even allocate private network addresses and combine the allocated addresses with, e.g., differentiation in port numbers. The server 330 may be informed about the addresses to be used for the streaming, e.g., by a signaling 412 from the edge node 310 to the server 330. The receiver 300 may be informed by the server 330 at which addresses the various angles are available, e.g., using destination metadata 402. The edge node 310 may also directly inform the receiver 300 about the addresses that will be used for streaming. The edge node 310 may either intercept signaling between receiver 300 and server 330 during the stream setup, or it may be an active entity in this, e.g., be a session border controller, a media-aware network element or another type of network proxy.

Figure 9:
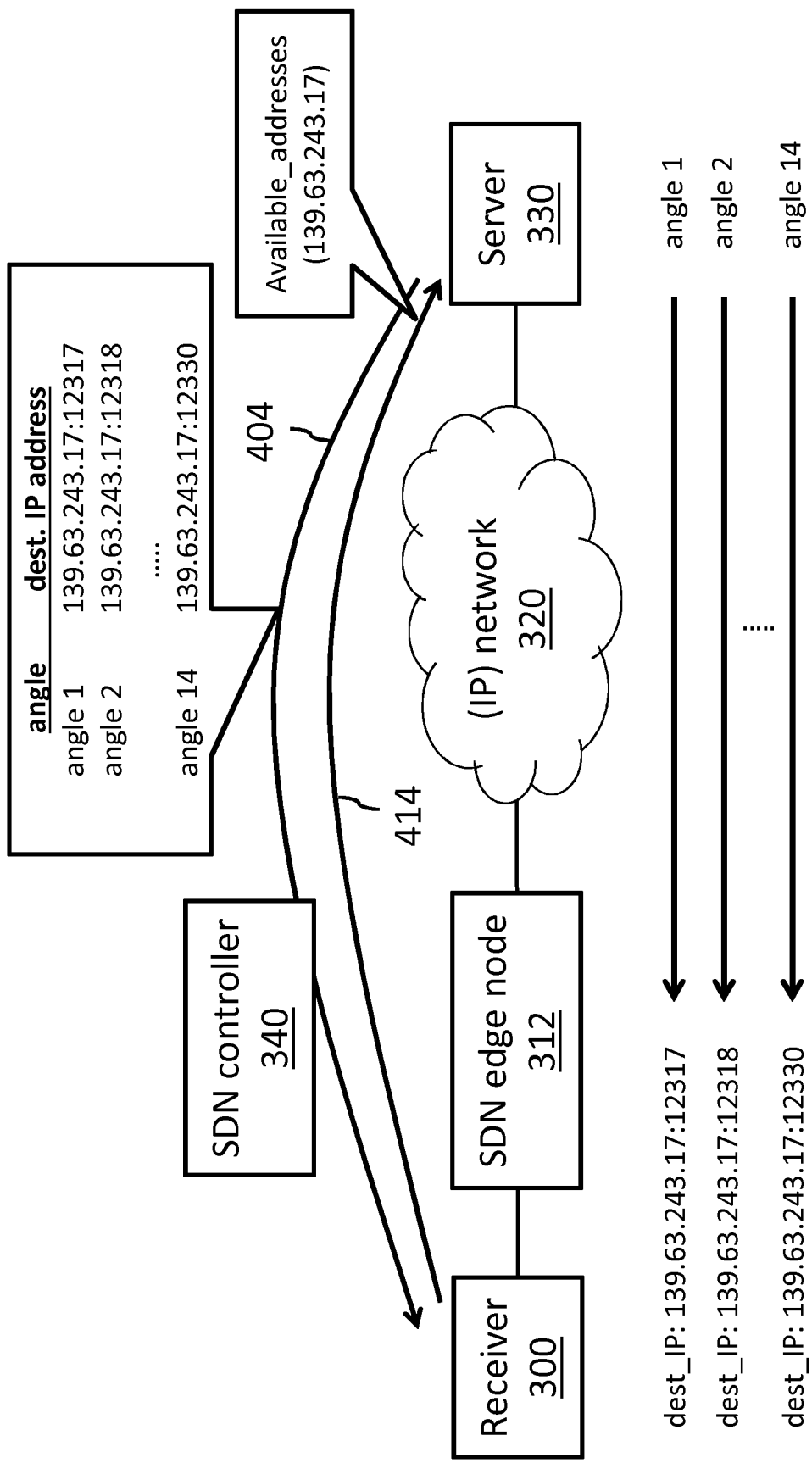
FIG. 9 illustrates the streaming of a plurality of streams to an edge node by way of using different ports for each of the streams.

FIG. 9 illustrates the streaming of a plurality of streams from a server 330 to an edge node 312 by using different ports for each of the streams. Namely, in the example of FIG. 9, the receiver 300 may only have a single network address assigned to it, which may be signaled to the server 330 using signaling 414. In this case, differentiation between the various angles may be possible by using port numbers, in that each angle may be transmitted using a different destination port. Accordingly, the destination metadata 404 may list different port numbers for each stream. It will be appreciated that not all switching techniques may be compatible with this approach, in particular switching techniques which operate on the so-termed 'IP layer', e.g., IP multicasting and ARP spoofing/poisoning as explained with reference to FIGS. 12 and 14. However, SDN switching techniques, which generally involve a SDN controller 340 controlling a SDN edge node 312 and which are further explained with reference to FIGS. 13 and 14, may allow for using port numbers, as SDN nodes may differentiate between various streams using destination (as well as source) port numbers.

Figure 10:
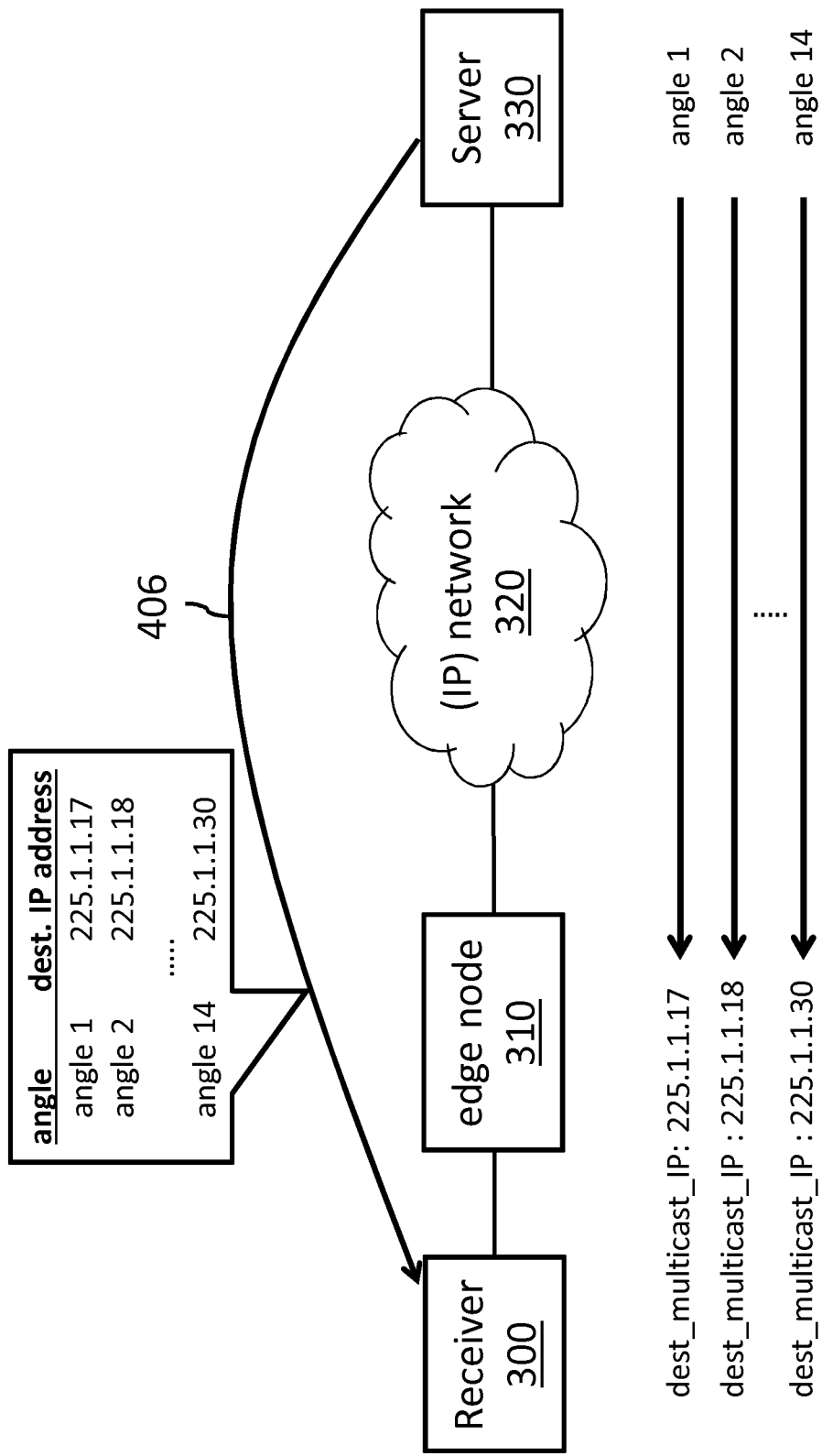
FIG. 10 illustrates the streaming of a plurality of streams to an edge node by way of using different IP multicast addresses.

FIG. 10 illustrates the streaming of a plurality of streams to an edge node by way of using different IP multicast addresses. In this embodiment, the server 330 may transmit the streams to different IP multicast addresses and may signal these to the receiver 300 in the form of destination metadata 406. These IP multicast addresses may be addresses for which the network is configured to forward these to the edge node. Namely, for fast switching between streams, the multicast may need to be used in a dense-mode configuration, which involves the streaming of all, or a larger subset of streams, to the edge node(s) 310 even when the receiver 300 is not requesting these streams from the server 330.

Figure 11:
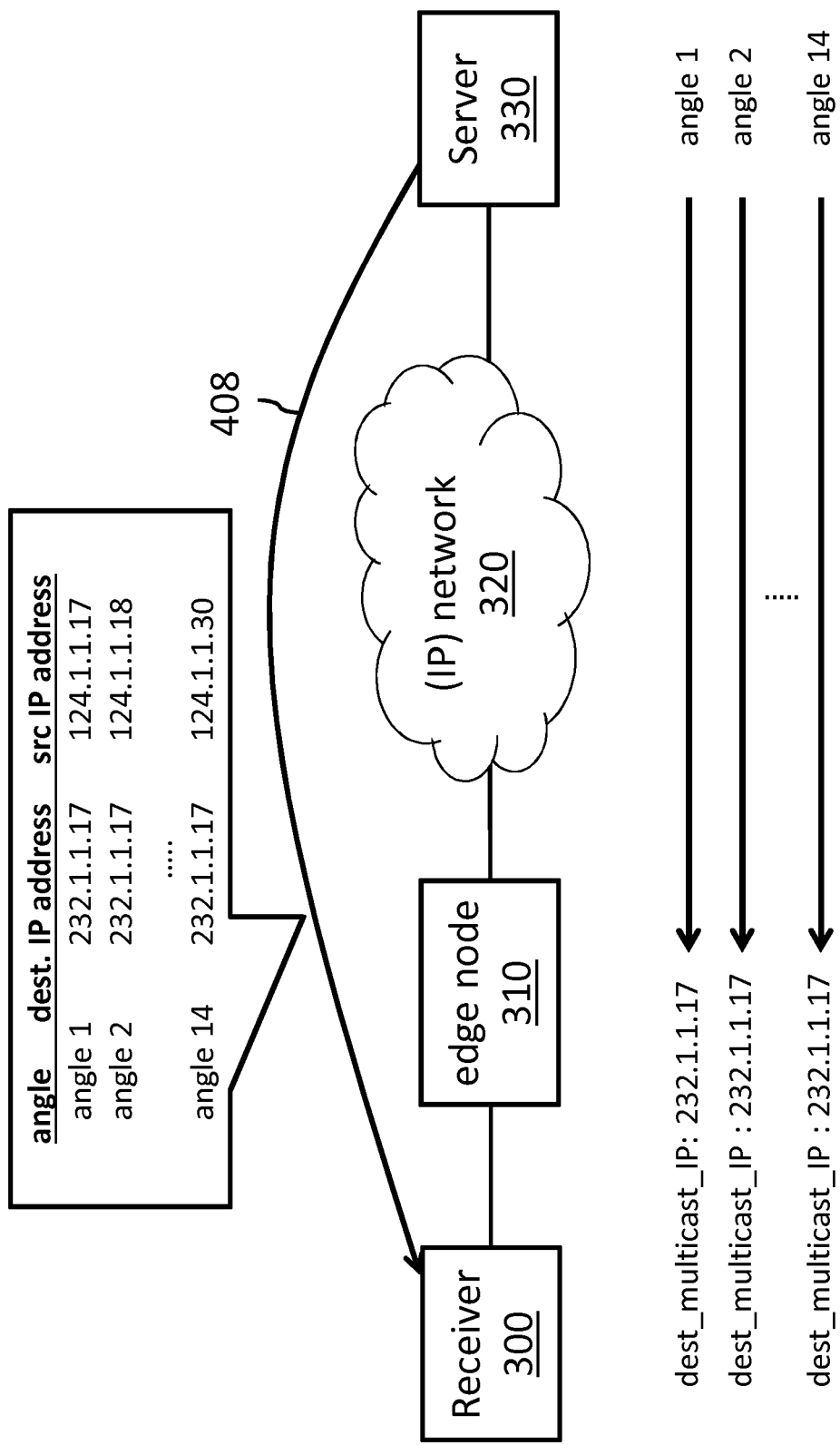
FIG. 11 illustrates the streaming of a plurality of streams to an edge node by way of using Source Specific Multicast.

FIG. 11 illustrates the streaming of a plurality of streams to an edge node 310 by way of using Source Specific Multicast, which represents an alternative for multicast addressing. Here, use is made of an IP multicast extension called Source Specific Multicast, described in RFC 4607. This extension allows for various sources to use the same IP multicast address, while still allowing receivers to request a certain stream from a certain source by indicating the source address in the IP multicast request. Accordingly, the destination metadata 408 provided to the receiver 300 may list the source IP address of each stream in addition to the destination IP address.

Having established the streaming of all, or a larger subset of streams, to the edge node(s), the selective forwarding of a subset of streams may be effected in various ways, of which various embodiments are described with reference to FIGS. 12-18. Here, for sake of simplicity, the VR video is represented by two streams, and the subset of streams which is to be rendered at any given time is one of the two streams.

It is noted that the selectively forwarding of a stream may be part of a switching from one subset to another subset of streams, e.g., in response to the user turning or moving his/her head, and may henceforth be described as a 'switching technique' which may in turn be described in terms of a firewall analogy. Namely, if one stream is currently streaming to the receiver, e.g., as a result of a gate or 'firewall' being open, the other stream may currently be stopped at the network edge, e.g., the gate or 'firewall' may be closed. As such, the switching technique may in essence involve opening the gate for the new stream, thereby causing the packets of the new stream to be forwarded to the receiver, and closing the gate for the old stream, thereby causing the packets of the old stream to be dropped at the network edge. This dropping may be the result of an explicit rule in the network node to 'drop' packets of a stream matching certain criteria. The dropping of packets may also occur because there is no valid forwarding rule, and dropping may be the action that is default for traffic which matches no forwarding rules. Or, the dropping may be the effect of the stream having a destination address that is not valid, or is local to the network node. Given enough bandwidth to at least temporarily stream two streams, the opening of the gate may be considered as most time-sensitive. In this case, the opening of the new gate may be performed first, and the closing of the other old gate second. When bandwidth is more limited, e.g., when it is insufficient for the consecutive streaming of the two streams, the old gate may be closed first before opening the new gate. There are various ways in which this 'opening and closing the gates' may be performed, including but not limited to IGMP join/leave operations, use of a SDN or similar programmable network, ARP spoofing/poisoning or a new MAC layer protocol.

IGMP Join/Leave

Figure 12:
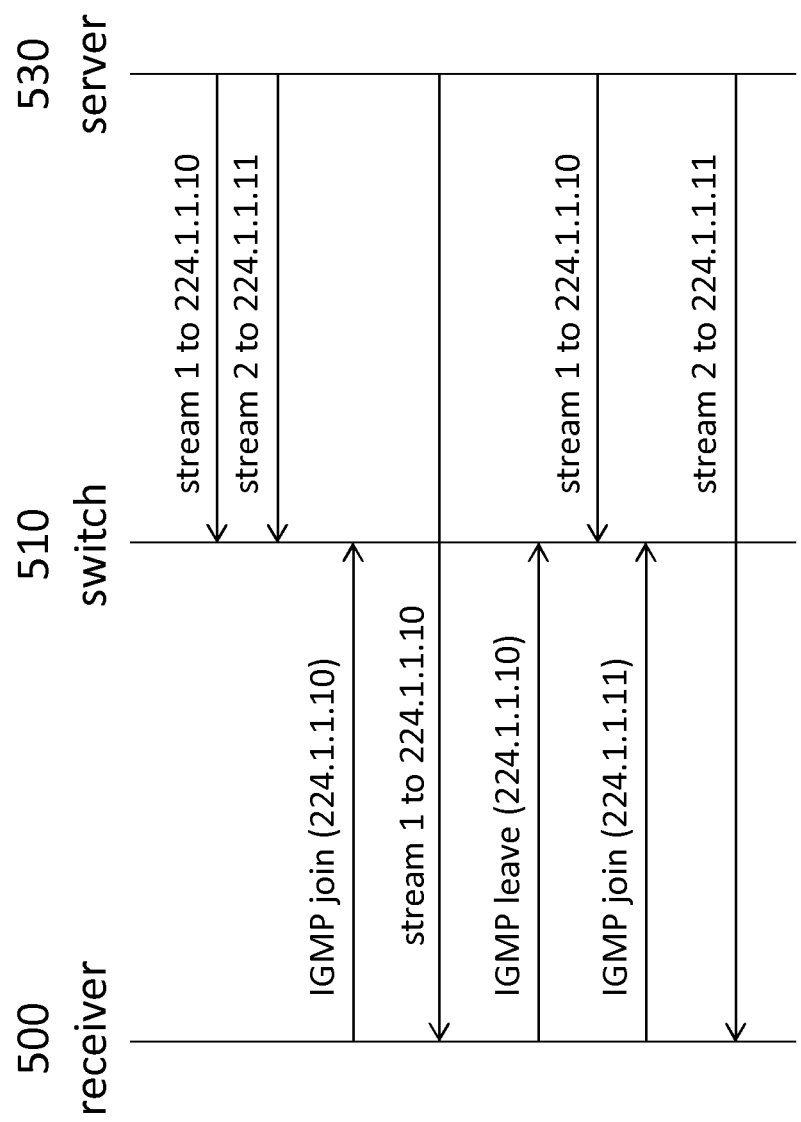
FIG. 12 shows a message exchange between the receiver, switch and server to selectively stream a stream to the receiver using multicasting.

As known in the art, multicasting may be performed in a dense-mode configuration. As such, multicast streams may be set up all the way to the edge of the network, even if there are no receivers currently requesting the streams. This may have as advantage that the entire multicast tree is set up beforehand, thereby lowering the startup delay when requesting a new stream. FIG. 12 illustrates a multicasting-based switching technique by showing a message exchange between a receiver 500, a switch 510 and a server 530. Here, the term switch is used to include all network nodes capable of switching multicast streams on request, which includes both multicast-aware switches (e.g., using IGMP snooping) and multicast-capable routers. Here, stream 1 and 2 may be continuously streamed by the server 530 to the switch 510. The receiver 500 may then join and leave streams by sending appropriate IGMP join or leave messages to the switch 510, causing the switch to forward and/or stop forwarding a respective stream. Low switching delays may be achieved by using the IGMP fast leave mechanism, also called 'immediate leave'. In this respect, it is noted that the current version 3 of IGMP, specified in RFC 3376, defines messages termed 'membership reports', in which a membership for a multicast address represents a joining of a group, and the removal of such a membership represents a leaving of a group. In general IGMP language, these are often still called IGMP join/leave messages, reflecting the old naming of these messages in the earlier IGMP version. Accordingly, any reference to IGMP join/leave is to be understood as including this 'membership'-type mechanism.

Software Defined Network (SDN)

Figure 13:
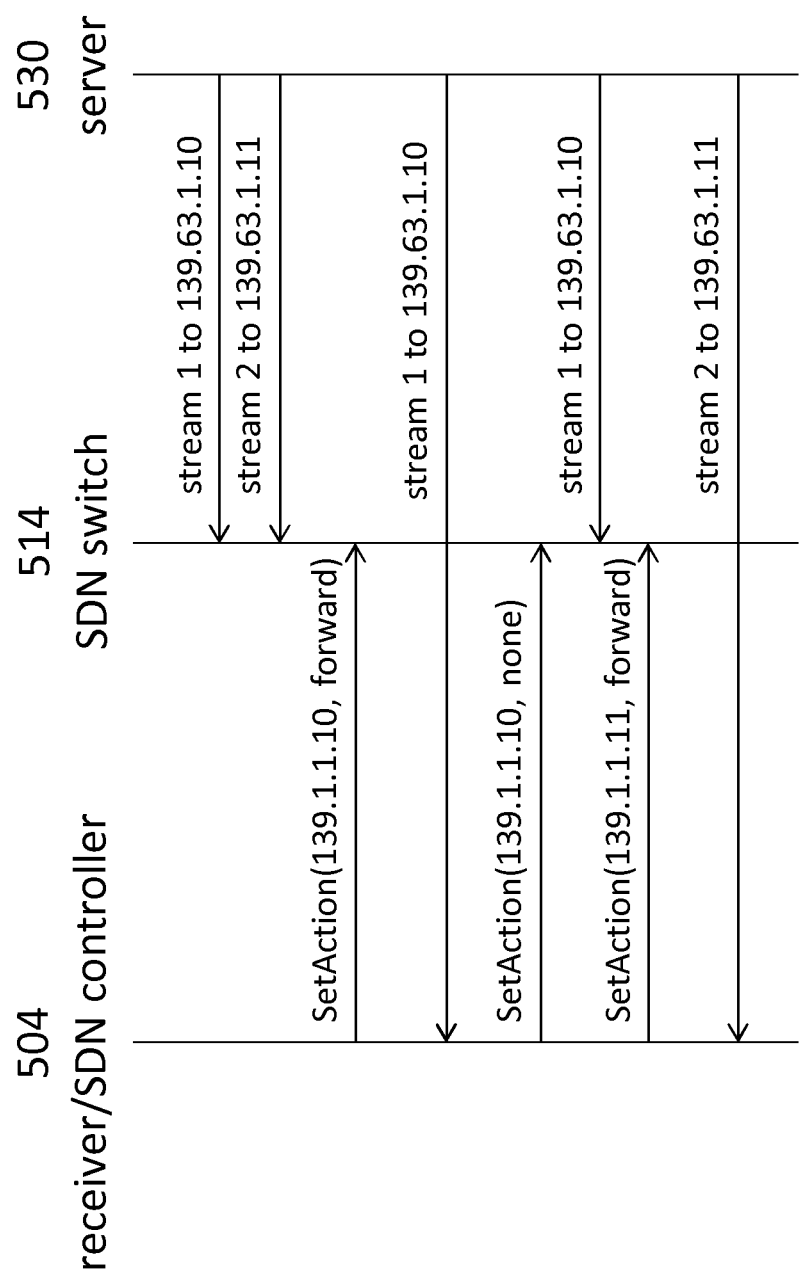
FIG. 13 shows a message exchange between the receiver, switch and server to selectively stream a stream to the receiver using SDN.

FIG. 13 shows a message exchange between a receiver 504, SDN switch 514 and server 530 to selectively stream a stream to the receiver using SDN. In this example, the switch 514 is a SDN-enabled switch (as mentioned, switch including all SDN-capable network nodes, including switches and routers), and receiver 504 comprises an SDN controller that is capable of configuring the SDN switch 514. Alternatively, the receiver may signal an external SDN controller to configure the SDN switch. The SDN switch 514 may be instructed to forward packets for a specified stream, or to drop packets for a specified stream, in accordance with one or more forwarding rules. In this example, the server 530 may send stream 1 and 2 to the SDN switch 514, namely by sending both streams to a respective destination IP address that terminates at the SDN switch 514. Here, the term 'terminates' may refer to 'is routed to', in that it may be an address of the SDN switch itself or it may be an address routable via the SDN switch. The default action on the SDN switch 514 may be configured to 'drop' a packet (e.g., take no action on the packet) so that none of the packets of the streams are forwarded. The receiver 504 may then instruct, optionally via an external SDN controller, the SDN switch 514 to forward certain streams, and switch streams by instructing the switch to drop one stream and forward another stream, e.g., by means of a 'SetAction' message specifying the destination IP address and the type of action, e.g., 'forward' or 'none' with the latter denoting a dropping.

Figure 14:
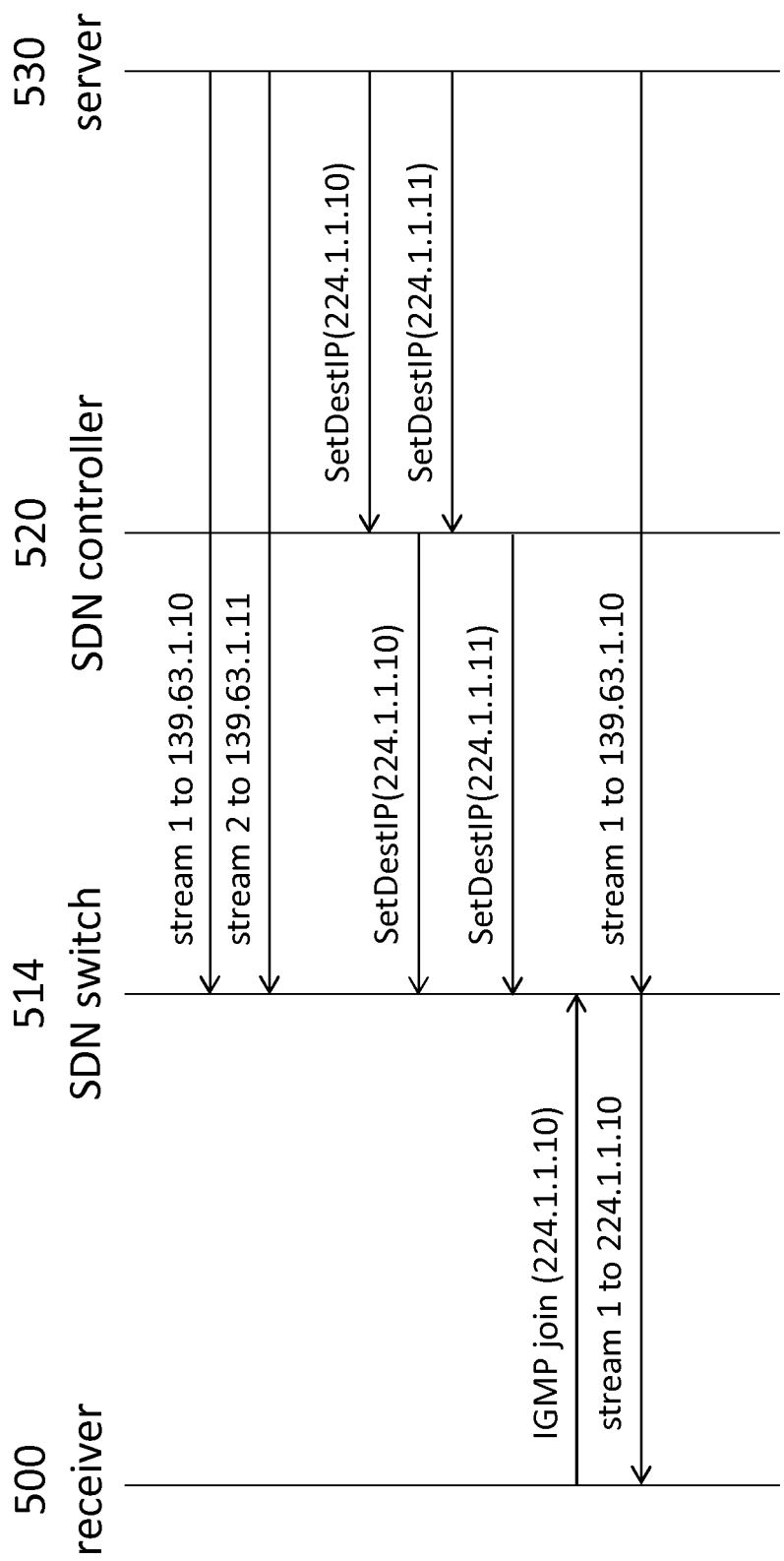
FIG. 14 shows a message exchange between the receiver, switch and server to selectively stream a stream to the receiver using multicasting and SDN.

FIG. 14 shows a message exchange between a receiver 500, SDN switch 514, SDN controller 520 and server 530 to selectively stream a stream to the receiver using the combination of multicasting with SDN. A disadvantage of multicasting may be that current networks normally only support it within one administrative domain. As such, the server providing the streams may need to be in the same network as the edge node. SDN may be used to address this problem. Namely, each stream may be sent as a unicast stream towards the network edge, e.g., the SDN-enabled switch 514. This switch may be configured, e.g., in real time, to change the unicast stream into a multicast stream. This may effectively create a dense-mode multicast situation for the receiver 500, which may then switch streams in a similar way as in the FIG. 12 embodiment. A node participating in the session setup may instruct the SDN controller 520 to perform the configuration. This may be either the server 530 or the receiver 500 or yet another server or node that is part of the session setup. Alternative, the SDN switch 514 may be pre-configured to change the destination IP address of certain IP addresses into certain other (multicast) IP addresses. If this is known to the server 530, the server 530 may use these static bindings instead of creating dynamic bindings.

ARP Spoofing/Poisoning

Figure 15:
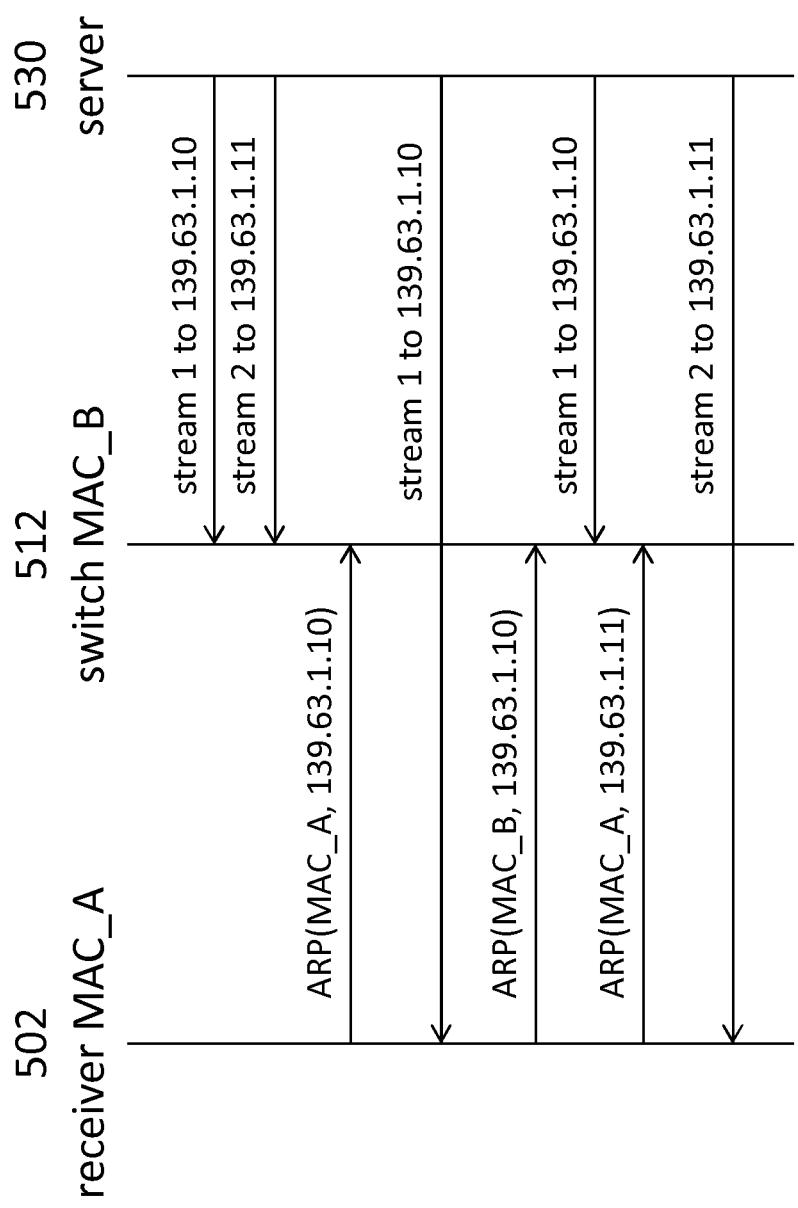
FIG. 15 shows a message exchange between the receiver, switch and server to selectively stream a stream to the receiver using ARP spoofing/poisoning.

FIG. 15 shows a message exchange between a receiver 502, switch 512 and server 530 to selectively stream a stream to the receiver using so-termed ARP spoofing, also sometimes called ARP poisoning. The Address Resolution Protocol is the layer 2 (MAC) protocol by which nodes inform each other on the relationship between IP address and MAC address. A switch typically maintains a table of these relationships, e.g., to enable forwarding of incoming IP packets to a certain MAC address. For this purpose, the switch may look up the IP address in its ARP table and forward the packets to the indicated MAC address. As ARP is an unsecure protocol, it allows for 'spoofing' or 'poisoning' of the ARP table of a node by another node. This may allow a receiver, e.g., the VR rendering device, to change the ARP table of the edge node by sending 'fake' combinations of hardware address, e.g., MAC address, and network address, e.g., IP address. This is illustrated in FIG. 15, where streams 1 and 2 are sent by the server 530 to separate IP addresses on a switch 512 on the network edge. These IP addresses are currently not in use, in that they may have no entry in the switch's ARP table. As such, the switch 512 may drop the packets of streams 1 and 2. The receiver 502 may effect the forwarding of stream 1 by causing the switch 512 to associate the destination IP address of stream 1 with the MAC address of the receiver 502, e.g., by an appropriate ARP message comprising its MAC address, e.g., MAC_A, and the destination IP address of stream 1. The switch 512 may then pass on all packets it receives for stream 1 to the receiver 502. The receiver 502 may later wish to switch to stream 2, and may do so by first stopping the forwarding of stream 1, namely by associating the destination IP address of stream 1 with the MAC address of the switch 512, e.g., MAC_B (or alternatively, with an all-zero MAC address). This may cause the switch 512 to drop the packets. The receiver 502 may then associate the destination IP address of stream 2 with the receiver's MAC address by an appropriate ARP message, thereby causing the switch 512 forward the packets of stream 2 to the receiver 502.

Figure 16:
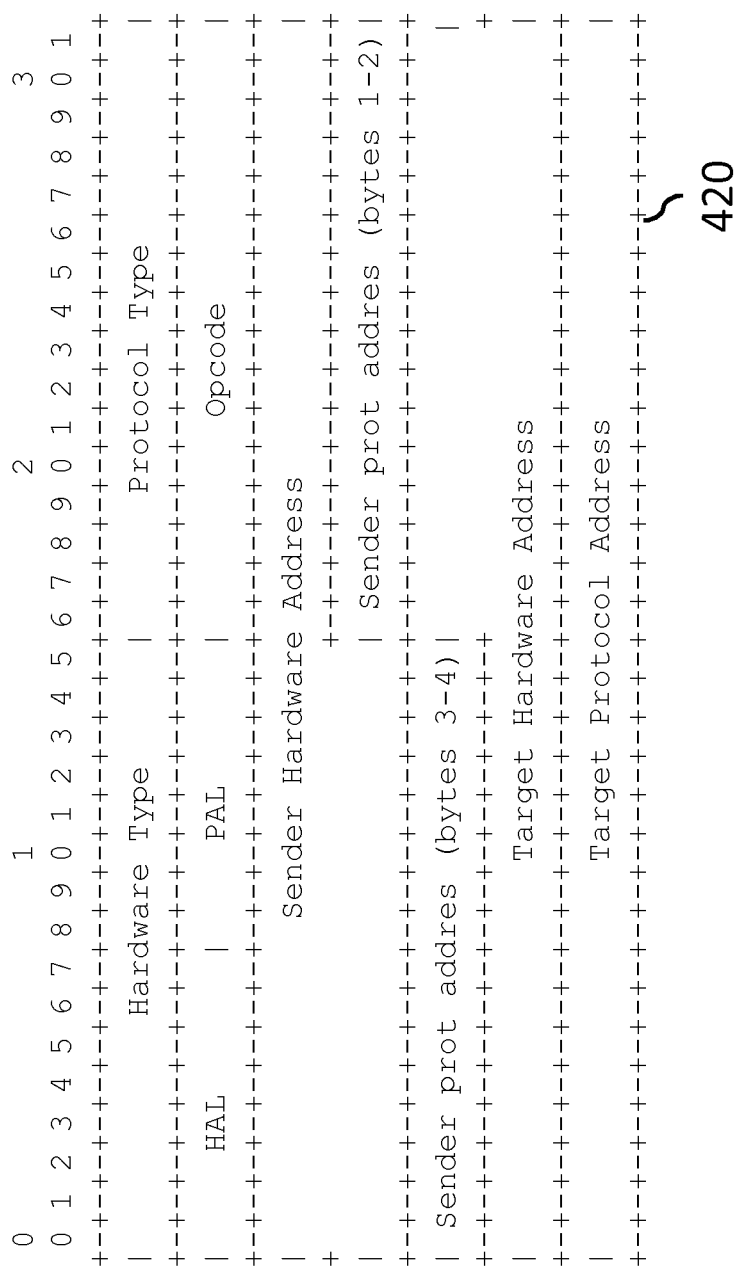
FIG. 16 shows a message format for the ARP protocol

FIG. 16 shows a format of a message 420 of the ARP protocol. In the message 420, first the hardware type and protocol type may be specified, e.g., Ethernet and IP protocol. Next, the Hardware Address Length (HAL) and Protocol Address Length (PAL) may be specified, e.g., 6 bytes for Ethernet MAC addresses and 4 bytes for IP protocol addresses. The message 420 is depicted with these lengths; however, other lengths are equally possible, e.g., for other hardware and protocol types. Next, the sender hardware address and protocol address may be specified, and finally the target hardware address and protocol address may be specified.

With continued reference to FIG. 15, MAC_A may be equal to AA:BB:CC:DD:EE:FF and MAC_B may be equal to FF:EE:DD:CC:BB:AA.

Figure 17:
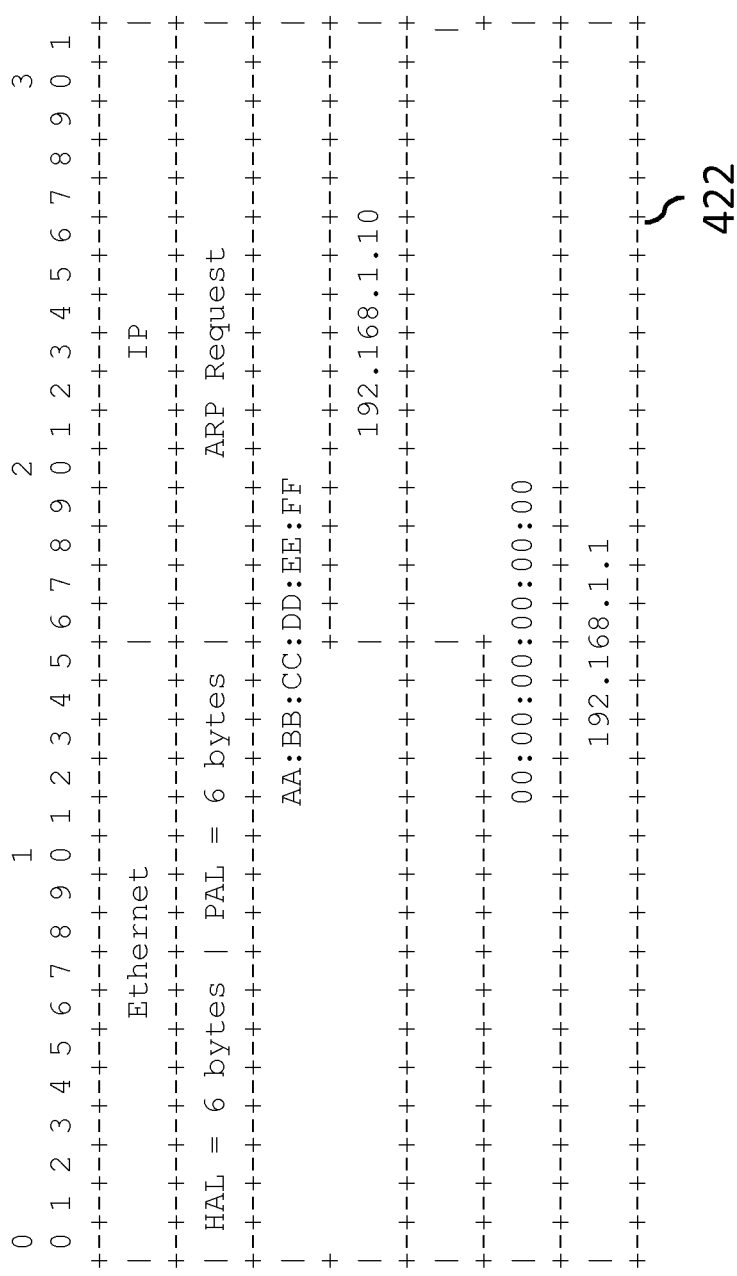
FIG. 17 shows an ARP request from a receiver to a switch.
Figure 18:
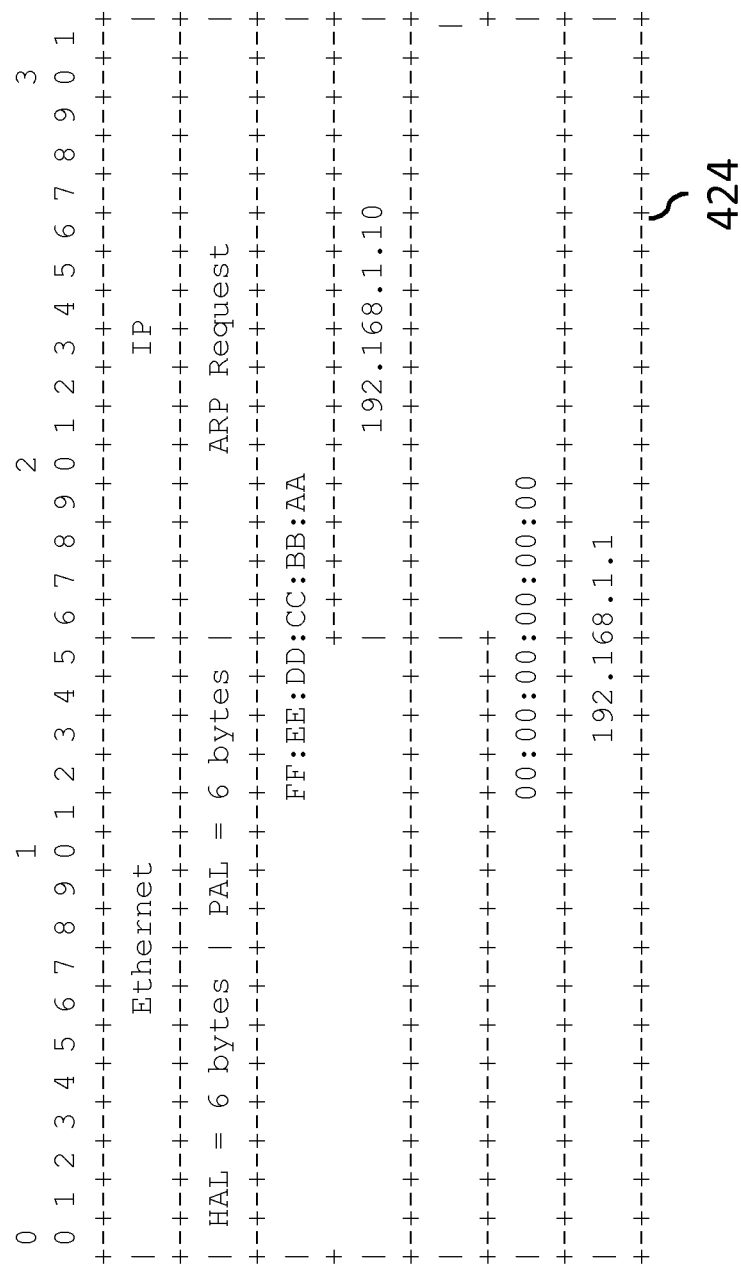
FIG. 18 shows another ARP request from the receiver to the switch.

FIG. 17 shows a message 422 representing an ARP request from the receiver to the switch, comprising the receiver's MAC as sender hardware address and 192.168.1.10 as sender protocol address, thereby creating an entry in the switch's ARP table which causes packets with destination IP address 192.168.1.10 to be forwarded to the receiver. FIG. 18 shows a message 424 representing an ARP request from the receiver, comprising the switch's MAC address as sender hardware address and 192.168.1.10 as sender protocol address. Accordingly, this message may instruct the switch to route packets having 192.168.1.10 as destination to itself, ending the association with the receiver. Alternatively, instead of specifying the switch's MAC address as sender hardware address, a non-existent hardware address or all-zero hardware address may be used instead. Depending on the configuration and type of switch, this may have a similar effect as specifying the switch's MAC address as sender hardware address.

It is noted that in the embodiments pertaining to ARP poisoning, the term 'switch' is used for the forwarding node, e.g., an edge node, which is meant to refer an entity within the network which translates a network address, e.g., IP address, to a hardware address, e.g., MAC address, for forwarding purposes. This entity may be, e.g., a layer 3 switch (typically used in an operator network) or a managed switch or a router. It will be appreciated that a 'dumb' layer 2 switch is typically unaware of the destination IP addresses of the packets as it does not function on the IP layer, and thus will not deal with ARP.

New MAC layer protocol Besides using existing techniques for causing the switch to dynamically 'open and close gates', it is also possible to devise new switching techniques. For example, on the MAC layer, a receiver may send a packet to the edge switch, which the edge switch may interpret as 'open this gate', and another packet that may be interpreted as 'close this gate'. This functionality may be provided by, e.g., a new MAC layer protocol, or possibly a new function that is part of an existing protocol.

Yet other alternatives for said 'opening and closing of gates' include, but are not limited to, VLAN tagging, dynamic VLANs, UDP port filtering, dynamic firewalling (e.g., using CLI interfaces to the switch), use of session border controllers, etc.

Figure 19:
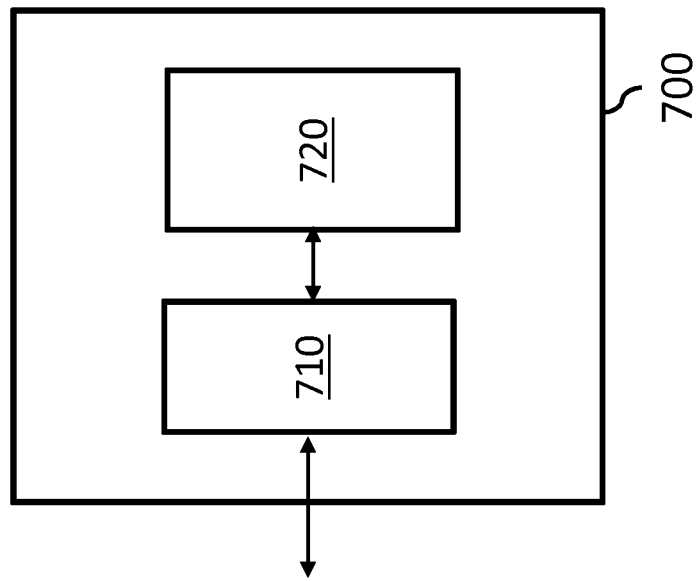
FIG. 19 shows an exemplary VR rendering device.

FIG. 19 shows an exemplary VR rendering device 600, which may comprise a processor 620 configured to determine a view of the scene which is to be rendered by the VR rendering device, and to identify one or more of the plurality of streams which are needed to render the view of the scene, thereby identifying a subset of streams. Moreover, the exemplary VR rendering device 600 may comprise a controller 630 configured to, in response to the view having to be rendered by the VR rendering device, signal the one or more forwarding nodes forwarding instructions for the one or more forwarding nodes to selectively forward the subset of streams to the VR rendering device. It will be appreciated that the VR rendering device 600 may comprise one or more displays for displaying the rendered VR environment. For example, the VR rendering device 600 may be a VR headset, e.g., referring to a head-mountable display device, or a smartphone or tablet device which is to be used in a VR enclosure, e.g., of a same or similar type as the 'Gear VR' or 'Google Cardboard'. Alternatively, the VR rendering device 600 may be device which is connected to a display or VR headset and which provides rendered images to the display or VR headset for display thereon. A specific example is that the VR rendering device 600 may be represented by a personal computer or game console which is connected to a separate display or VR headset, e.g., of a same or similar type as the 'Oculus Rift', 'HTC Vive' or 'PlayStation VR'. Other examples of VR rendering devices are so-termed Augmented Reality (AR) devices that are able to play-out VR video, such as the Microsoft HoloLens. Yet another exemplary embodiment will be described with reference to FIG. 23.

As further shown in FIG. 19, the VR rendering device 600 may comprise an input/output interface 610, e.g., to receive the subset of streams and/or to signal the one or more forwarding nodes. The input/output interface 610 may be a network interface of a type which matches the type of access network, e.g., a Wi-Fi interface, Bluetooth interface, ZigBee Interface, cellular interface, Ethernet interface, etc. Moreover, although not shown in FIG. 19, the VR rendering device 600 may comprise one or more memories, which may be used for various purposes, including but not limited to storing destination metadata which may be received from a server.

It is noted that the VR rendering device may be aware of when to switch streams on the basis of a measured head rotation or head movement of a user. It is noted that measuring the head rotation or head movement of a user is known per se in the art, e.g., using gyroscopes, cameras, etc. The head rotation or head movement may be measured by the VR rendering device itself, e.g., by comprising a gyroscope, camera, or camera input connected to an external camera recording the user, or by an external device, e.g., an external VR headset connected to the VR rendering device or an external camera recording the VR headset from the outside, e.g., using so-termed 'outside-in' tracking, or a combination thereof. Moreover, although the switching of streams may be in response to a head rotation or head movement, the invention as claimed is not limited thereto, as there may also be other reasons to render a different view of the panoramic scene and thereby to switch streams. For example, the switching of streams may be in anticipation of a head movement, e.g., because a sound associated with the VR video from a certain direction may trigger the user to rotate his head into that certain direction, with an oncoming occurrence of the sound triggering the switching. In general, any known technique may be used for determining that a particular new subset of streams is to be forwarded from the forwarding node(s).

Figure 20:
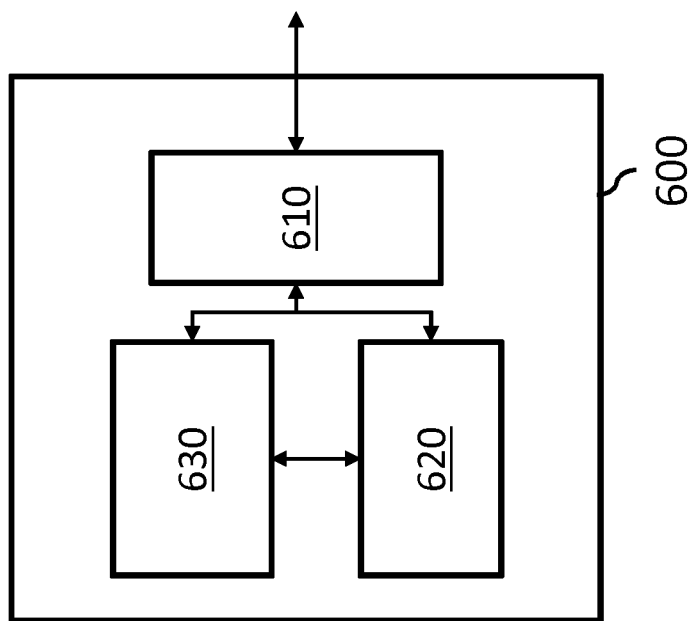
FIG. 20 shows an exemplary forwarding node.

FIG. 20 shows an exemplary forwarding node 700, which may comprise a signaling interface 710 configured to receive forwarding instructions to change one or more forwarding rules of the forwarding node so as to selectively forward one or more of the plurality of streams to a VR rendering device, and a controller 720 configured to effect the forwarding instructions by changing the one or more forwarding rules of the forwarding node. The signaling interface 710 may be, or may be part of, an input/output interface, which in turn may be a network interface such as, but not limited to, an Ethernet or fiber optic-based local or wide area network (LAN, WAN) interface. The forwarding node may be a network switch or network router. Another exemplary embodiment of the forwarding node will be described with reference to FIG. 23.

Figure 21:
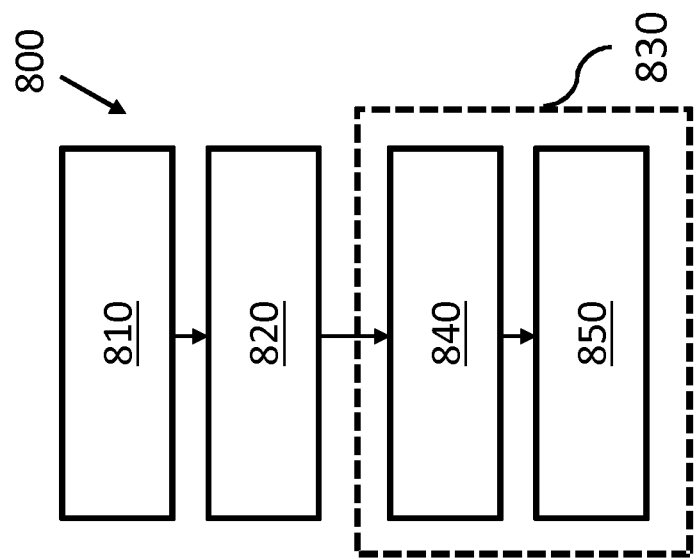
FIG. 21 shows a method for streaming a VR video to a VR rendering device.

FIG. 21 shows a method 800 for streaming a VR video to a VR rendering device. The method 800 may comprise, in an operation titled 'DETERMINING VIEW OF SCENE TO BE RENDERED', determining 810 a view of the scene which is to be rendered by the VR rendering device. The method 800 may further comprise, in an operation titled 'IDENTIFYING NEEDED STREAM(S)', identifying 820 one or more of the plurality of streams which are needed to render the view of the scene, thereby identifying a subset of streams. The method 800 may further comprise, in an operated titled 'EFFECTING STREAMING OF NEEDED STREAM(S)', effecting 830 a streaming of the subset of streams via a network from one or more stream sources to the VR rendering device by, in an operation titled 'STREAMING ALL STREAMS TO FORWARDING NODE(S)', streaming 840 the plurality of streams from the one or more stream sources to one or more forwarding nodes downstream of the one or more stream sources and upstream of the VR rendering device, and in an operation titled 'SELECTIVELY FORWARDING NEEDED STREAM(S)', selectively 850 forwarding the subset of streams from the one or more forwarding nodes to the VR rendering device in response to the view having to be rendered by the VR rendering device.

It will be appreciated that the above operation may be performed in any suitable order, e.g., consecutively, simultaneously, or a combination thereof, subject to, where applicable, a particular order being necessitated, e.g., by input/output relations.

Figure 22:
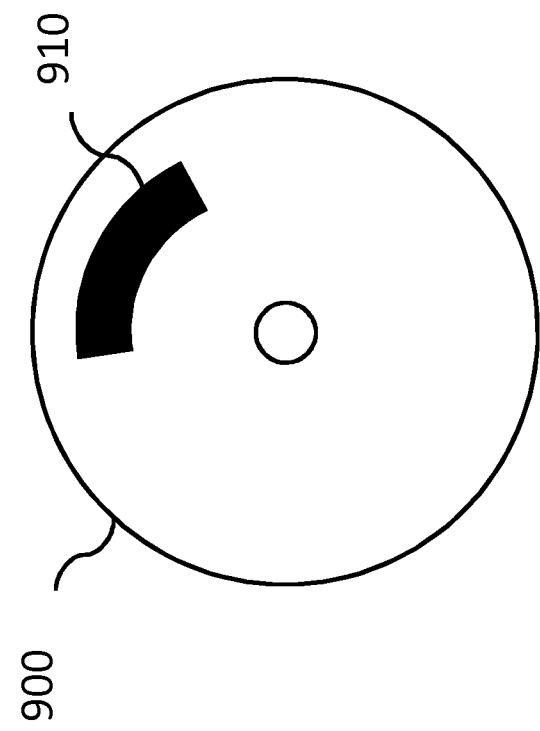
FIG. 22 shows a transitory or non-transitory computer-readable medium which may comprise computer program comprising instructions for a processor system to perform the method, or forwarding instructions, or destination metadata.

The method 800 may be implemented on a processor system, e.g., on a computer as a computer implemented method, as dedicated hardware, or as a combination of both. As also illustrated in FIG. 22, instructions for the computer, e.g., executable code, may be stored on a computer readable medium 900, e.g., in the form of a series 910 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 22 shows an optical disc 900.

Alternatively, the computer-readable medium 900 may comprise destination metadata for use by a Virtual Reality [VR] rendering device configured to render a VR video, wherein the VR video is represented at least in part by a plurality of streams, and wherein the destination metadata is indicative of a network destination of a streaming of each of the plurality of streams within a network. For example, the destination metadata may list, for each of the plurality of streams, a destination network address of the respective stream. Additionally, the destination metadata may be indicative of a spatial relationship of a stream with respect to other streams, e.g., by indicating a cardinal direction or sequentially enumerating the streams. Additionally, the destination metadata may be indicative of how the stream may be accessed, e.g., how the forwarding node(s) may be instructed to forward the particular stream.

Alternatively, the computer-readable medium 900 may comprise forwarding instructions for use by one or more forwarding nodes in a network, wherein the one or more forwarding nodes may be a network destination of a streaming of a plurality of streams, and wherein the forwarding instructions may be configured to instruct the one or more forwarding nodes to selectively forward of one or more of the plurality of streams to Virtual Reality [VR] rendering device. For example, the forwarding instructions may be instructions on a control plane of a SDN for a SDN switch.

In general, not all of the streams representing the VR video may need to be streamed to the forwarding node(s) on a continuous basis. Rather, it may suffice to stream the currently forwarded streams, e.g., a particular subset of streams, as well as adjacent streams, e.g., providing spatially adjacent video information. As such, a larger subset of streams may be streamed to the forwarding node(s) which encompasses the currently forwarded subset of streams. The selection of streams comprised in the larger subset may be adjusted, e.g., in response to a new subset of streams having to be streamed. As such, the streaming to the forwarding node(s) may be continuously or periodically adjusted, e.g., in response to head rotation or head movement.

Moreover, when using spatially segmented or tiled video streams, switching of streams may involve requesting segments from a new region and stop requesting tiles from an old region. If a dense spatial segmentation is employed, e.g., with a stream only corresponding to a limited field of view, only a limited number of segments on the one side of the current view may be dropped in response to head rotation, and thereby the corresponding streams, and a limited number of new segments on the other side of the current view may be added as new streams: a large part of what is visible may thus remain unchanged. As such, there may be a considerable overlap between a previous and a new subset of streams. This embodiment may have a relatively constant bandwidth consumption, even when switching streams.

It will be appreciated that the selective forwarding techniques as described in this disclosure may be applied to so-termed tiled or segmented streaming, in which the panoramic video, e.g., a 360 video, is divided into a plurality of tiles/segments, which may each be represented by a different stream. Moreover, the techniques may be applied to so-termed pyramidal encoding, in which the different streams represent different versions of the entire content, each comprising a different part in high quality and the remainder in lower quality. The selective forwarding techniques as described in this disclosure may also be applied to cloud rendering, in which a current viewport is rendered within the cloud for the VR rendering device, e.g., based on the current orientation of the device. Different adjacent viewports may also be cloud rendered, e.g., a current viewport and a viewport to the left and one to the right, which may then be transmitted as separate streams towards the network edge. A subset of the streams may then be selectively forwarded to the VR rendering device in response to, e.g., a head rotation. The various approaches for streaming VR video may be combined. It will be appreciated that the streaming to the forwarding nodes may be cloud-based, in that the plurality of streams may be streamed from a distributed system of media servers, or in general, may be streamed from a plurality of shared computing resources.

It will be appreciated that, when switching streams, it may be advantageous to ensure than an I-Frame of the new stream(s) is provided to the receiver as fast as possible. There are several known techniques for this, e.g., from the field of IPTV where they are known as 'Fast Channel Change' or 'Rapid Channel Change', which may be used in conjunction with the techniques described in this disclosure.

Furthermore, the selective forwarding techniques as described in this disclosure may also be used in case there are multiple terminals that receive the same content. The various viewing angles may be transmitted as streams through the network. If these are or can be multicasted (e.g., using SDN or another technique), multiple terminals may receive the same content efficiently. This is similar to regular multicasting, with multiple terminals behind the same access node. In such a case, the described selective forwarding may be applied per terminal, while the transmission of streams towards the access node may only need to be performed once.

Figure 23:
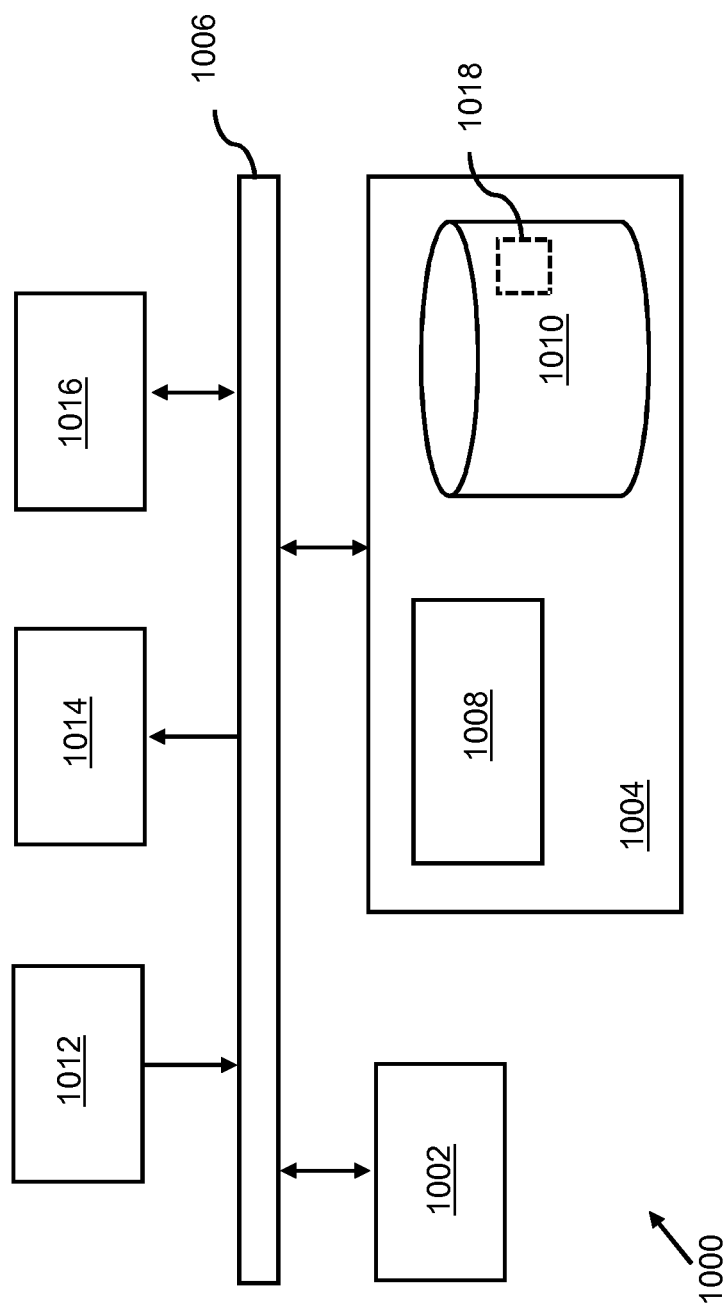
FIG. 23 shows an exemplary data processing system.

FIG. 23 is a block diagram illustrating an exemplary data processing system that may be used in the embodiments of this disclosure. Such data processing systems include data processing entities described in this disclosure, including but not limited to the VR rendering device and the forwarding node. Data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It will be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 may optionally be coupled to the data processing system. Examples of input devices may include, but are not limited to, for example, a microphone, a keyboard, a pointing device such as a mouse, or the like. Examples of output devices may include, but are not limited to, for example, a monitor or display, speakers, or the like. Input device and/or output device may be coupled to data processing system either directly or through intervening I/O controllers. A network adapter 1016 may also be coupled to, or be part of, the data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 23, memory elements 1004 may store an application 1018. It should be appreciated that the data processing system 1000 may further execute an operating system (not shown) that may facilitate execution of the application. The application, being implemented in the form of executable program code, may be executed by data processing system 1000, e.g., by the processor 1002. Responsive to executing the application, the data processing system may be configured to perform one or more operations to be described herein in further detail.

In one aspect, for example, the data processing system 1000 may represent a VR rendering device. In that case, the application 1018 may represent an application that, when executed, configures the data processing system 1000 to perform the various functions described herein with reference to the VR rendering device and its processor and controller. Here, the network adapter 1016 may represent an embodiment of the input/output interface of the VR rendering device. In another aspect, the data processing system 1000 may represent a forwarding node. In that case, the application 1018 may represent an application that, when executed, configures the data processing system 1000 to perform the various functions described herein with reference to the forwarding node and its controller. Here, the network adapter 1016 may represent an embodiment of the signaling interface of the forwarding node.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of streaming a Virtual Reality (VR) video to a VR rendering device over a network, wherein the VR rendering device is connected to the network via a bandwidth constrained access network, wherein the VR video is represented at least in part by a plurality of streams each associated with a different view of a scene, the method comprising:
   determining a view of the scene which is to be rendered by the VR rendering device;
   identifying one or more of the plurality of streams which are needed to render the view of the scene, thereby identifying a subset of streams; and
   effecting a streaming of the subset of streams via the network from one or more stream sources to the VR rendering device by:
   i) streaming the plurality of streams from the one or more stream sources to one or more Software Defined Network (SDN) nodes downstream of the one or more stream sources and upstream of the VR rendering device, wherein the one or more SDN nodes are edge nodes of the network at the edge of the bandwidth constrained access network, wherein each of the plurality of streams is streamed to the one or more SDN nodes in unicast;
   ii) controlling the one or more SDN nodes to convert each of the unicast streams into a multicast stream;
   iii) signaling the one or more SDN nodes forwarding instructions by the VR rendering device to change one or more forwarding rules so as to effect a selectively forwarding of the subset of streams, wherein the VR rendering device is a SDN controller; and
   iv) selectively forwarding the subset of streams from the one or more SDN nodes to the VR rendering device in response to the view having to be rendered by the VR rendering device on the basis of the one or more forwarding rules, wherein the selectively forwarding of the subset of streams comprises controlling the one or more SDN nodes using the VR rendering device as the SDN controller to forward packets of the subset of streams to the VR rendering device and to drop packets of other streams of the plurality of streams that are not in the subset of streams.

2. The method according to claim 1, wherein the selectively forwarding the subset of streams comprises:
   stopping forwarding of a previous subset of streams which were previously selectively forwarded to the VR rendering device.

3. The method according to claim 2, wherein the method comprises starting the selectively forwarding of the subset of streams before stopping the selectively forwarding of the previous subset of streams.

4. The method according to claim 1, wherein the selectively forwarding of the subset of streams comprises the VR rendering device joining a multicast group providing the subset of streams.

5. The method according to claim 1, wherein the selectively forwarding of the subset of streams comprises modifying an Address Resolution Protocol (ARP) table of the one or more SDN nodes to specify a hardware address of the VR rendering device as recipient of the subset of streams.

6. The method according to claim 1, further comprising signaling destination metadata to the VR rendering device which is indicative of a network destination of the streaming of each of the plurality of streams.

7. A non-transitory computer-readable medium comprising a computer program, the computer program comprising instructions for causing a processor system to perform the method according to claim 1.

8. A Virtual Reality (VR) rendering device for rendering a VR video, wherein the VR rendering device is connectable to a network via a bandwidth constrained access network, wherein the VR video is represented at least in part by a plurality of streams each associated with a different view of a scene, the VR rendering device comprising:
  an input interface for receiving destination metadata indicative of a network destination of a streaming of each of the plurality of streams within the network, wherein the network destination comprises one or more Software Defined Network (SDN) nodes in a network downstream of one or more stream sources streaming the plurality of streams and upstream of the VR rendering device, wherein the one or more SDN nodes are edge nodes of the network at the edge of the bandwidth constrained access network, wherein each of the plurality of streams is streamed to the one or more SDN nodes in unicast;
  a processor configured to:
    i) determine a view of the scene which is to be rendered by the VR rendering device;
    ii) identify, on the basis of the destination metadata, one or more of the plurality of streams which are needed to render the view of the scene, thereby identifying a subset of streams which is to be selectively forwarded by the one or more SDN nodes to the VR rendering device; and
  a controller configured to, on the basis of the destination metadata and in response to the view having to be rendered by the VR rendering device, signal the one or more SDN nodes forwarding instructions for the one or more SDN nodes to selectively forward the subset of streams to the VR rendering device by:
    i) controlling the one or more SDN nodes to convert each of the unicast streams into a multicast stream;
    ii) signaling the one or more SDN nodes forwarding instructions by the VR rendering device to change one or more forwarding rules so as to effect a selectively forwarding of the subset of streams, wherein the VR rendering device is a SDN controller; and
    iii controlling the one or more SDN nodes to selectively forward the subset of streams from the one or more SDN nodes to the VR rendering device in response to the view having to be rendered by the VR rendering device on the basis of the one or more forwarding rules and to drop packets of other streams of the plurality of streams that are not in the subset of streams.

9. A Software Defined Network (SDN) node configured to receive a plurality of streams each associated with a scene of a Virtual Reality (VR) video when located in a network downstream of one or more stream sources streaming the plurality of streams and upstream of a VR rendering device, wherein each of the plurality of streams is streamed to the SDN node in unicast, the SDN node comprising:
  a signaling interface configured to receive forwarding instructions from an SDN controller to change one or more forwarding rules of the SDN node, wherein the VR rendering device is a SDN controller, so as to selectively forward a subset of one or more of the plurality of streams to the VR rendering device; and
  a controller configured to effect the forwarding instructions by changing the one or more forwarding rules of the SDN node, the forwarding comprising converting each of the unicast streams into a multicast stream, and forwarding packets of the subset of streams to the VR rendering device and to drop packets of other streams of the plurality of streams that are not in the subset of streams.

10. The SDN node according to claim 9, wherein the SDN node is a network switch or network router.

* * * * *